(12) United States Patent
Fujii

(10) Patent No.: US 7,430,001 B2
(45) Date of Patent: Sep. 30, 2008

(54) IMAGE SENSING SYSTEM, COMMUNICATION APPARATUS AND IMAGE SENSING APPARATUS HAVING REMOTE CONTROL FUNCTION, AND THEIR CONTROL METHOD

(75) Inventor: Kenichi Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 755 days.

(21) Appl. No.: 10/411,832

(22) Filed: Apr. 11, 2003

(65) Prior Publication Data

US 2003/0193576 A1  Oct. 16, 2003

(30) Foreign Application Priority Data

| Apr. 12, 2002 | (JP) | 2002-111208 |
| Apr. 12, 2002 | (JP) | 2002-111209 |
| Mar. 18, 2003 | (JP) | 2003-074258 |
| Mar. 18, 2003 | (JP) | 2003-074259 |

(51) Int. Cl.
*H04N 5/225* (2006.01)
*H04N 5/232* (2006.01)

(52) U.S. Cl. .......................... 348/211.2; 348/211.99; 348/211.8; 348/211.1; 348/211.4

(58) Field of Classification Search ..............................
348/211.99–211.14, 211.4, 211.1, 207.99, 348/207.1, 211.8; 396/264, 286
See application file for complete search history.

(56) References Cited

U.S. PATENT DOCUMENTS

| 4,420,773 | A | | 12/1983 | Toyoda et al. ................ 358/335 |
| 5,793,367 | A | * | 8/1998 | Taguchi ........................ 715/756 |
| 6,411,780 | B1 | * | 6/2002 | Maruyama ..................... 396/59 |
| 6,628,899 | B1 | * | 9/2003 | Kito ............................... 396/56 |
| 6,853,403 | B1 | * | 2/2005 | Inoue et al. ............. 348/333.11 |
| 6,950,126 | B1 | * | 9/2005 | Homma et al. ......... 348/211.99 |
| 6,982,747 | B2 | * | 1/2006 | Yamagishi ............... 348/211.1 |
| 7,012,636 | B2 | * | 3/2006 | Hatanaka ............... 348/211.99 |
| 7,015,949 | B1 | * | 3/2006 | Sah .......................... 348/207.1 |
| 7,046,291 | B2 | * | 5/2006 | Saito ........................... 348/367 |
| 7,062,230 | B1 | * | 6/2006 | Ishiguro et al. ............... 455/91 |
| 7,106,364 | B1 | * | 9/2006 | Noro et al. ............... 348/211.3 |
| 2001/0015757 | A1 | * | 8/2001 | Saito .......................... 348/207 |
| 2001/0022624 | A1 | * | 9/2001 | Tanaka et al. .......... 348/333.02 |

(Continued)

FOREIGN PATENT DOCUMENTS

JP       57058468       4/1982

(Continued)

OTHER PUBLICATIONS

Japanese Final Rejection dated Apr. 21, 2008, concerning basic Japanese Patent Appln. No. 2003-074258.

(Continued)

*Primary Examiner*—Nhan T. Tran
*Assistant Examiner*—Pritham Prabhakher
(74) *Attorney, Agent, or Firm*—Morgan & Finnegan, LLP

(57) ABSTRACT

A system according to this invention easily and adequately notifies, on a remote controller, the user of the release timing on an image sensing apparatus side. To accomplish this, the remote controller receives a release timing signal associated with the image sensing timing from a digital camera, and notifies the image sensing timing on the basis of the received release timing signal.

21 Claims, 22 Drawing Sheets

U.S. PATENT DOCUMENTS

| | | | |
|---|---|---|---|
| 2002/0047905 A1* | 4/2002 | Kinjo | 348/207 |
| 2002/0063781 A1* | 5/2002 | Aizawa | 348/211 |
| 2002/0149678 A1* | 10/2002 | Shiki et al. | 348/207.2 |

FOREIGN PATENT DOCUMENTS

| | | |
|---|---|---|
| JP | 63104039 | 5/1988 |
| JP | 02-031569 | 2/1990 |
| JP | 02-242245 | 9/1990 |
| JP | A5-072608 | 3/1993 |
| JP | A10-274802 | 10/1998 |
| JP | 11-174576 | 7/1999 |
| JP | 2000-032320 | 1/2000 |
| JP | A2000-019629 | 1/2000 |
| JP | 2000-165707 | 6/2000 |
| JP | 2001-117156 | 4/2001 |
| JP | A2001-275030 | 10/2001 |
| JP | 2001359066 | 12/2001 |
| JP | 2002-057926 | 2/2002 |
| JP | 2002-090862 | 3/2002 |

OTHER PUBLICATIONS

Japanese Final Rejection dated Apr. 21, 2008, concerning basic Japanese Patent Appln. No. 2003-074259.

* cited by examiner

IMAGE SENSING SYSTEM, COMMUNICATION APPARATUS AND IMAGE SENSING APPARATUS HAVING REMOTE CONTROL FUNCTION, AND THEIR CONTROL METHOD

FIELD OF THE INVENTION

The present invention relates to an image sensing system, a communication apparatus and image sensing apparatus having a remote control function, and their control method.

BACKGROUND OF THE INVENTION

Conventionally, some image sensing apparatuses such as a digital still camera, digital video camera, and the like can be remotely controlled by remote controllers via wireless communications that exploit infrared rays or radio waves.

A remote controller for such conventional image sensing apparatus is disclosed in, e.g., Japanese Patent Laid-Open Nos. 5-72608, 2001-275030, 10-274802, and 2000-19629.

According to a device disclosed in Japanese Patent Laid-Open No. 5-72608, a sensed image can be visually confirmed on the display of a remote controller, and whether or not an image sensing operation is actually done can be confirmed based on, e.g., flash light.

On the other hand, according to a device disclosed in Japanese Patent Laid-Open No. 2001-275030, whether or not an image sensing operation is actually done, image sensing information indicating if the memory/battery capacity is insufficient, a current composition, whether or not an image sensing operation can be normally done, and so forth can be confirmed on the side of a remote controller.

In Japanese Patent Laid-Open No. 10-274802, upon receiving a self-timer shot instruction, a remote controller plays back a voice recorded in advance, and sends a release signal to an image sensing apparatus upon completion of this playback. The image sensing apparatus senses an image in response to that release signal, and sends an end signal to the remote controller upon completion of the image sensing operation. Upon reception of the end signal, the remote controller plays back a message that announces the end of the image sensing operation.

Japanese Patent Laid-Open No. 2000-19629 discloses a system in which when a remote controller issues a self-timer shot instruction to an image sensing apparatus, the image sensing apparatus that received the instruction transmits a timing signal to the remote controller at given time intervals. In this system, the remote controller bleeps every time it receives a timing signal, and then beeps for a long tone generation time upon reception of a predetermined number of timing signals (corresponding to a release wait time of the image sensing apparatus), thus notifying the user of release.

However, there is no conventional technique that allows the user to accurately confirm, on the remote controller side, the release (image sensing) timing of the image sensing apparatus side, i.e., the wait time until image sensing upon sensing an image using a so-called self timer or the like.

For example, Japanese Patent Laid-Open Nos. 5-72608 and 2001-275030 have no means that allow the user to confirm, on the remote controller side, the release (image sensing) timing of the image sensing apparatus side, i.e., the wait time until image sensing upon sensing an image using a so-called self timer or the like. In the method of notifying the release timing of the image sensing apparatus by flash light, electric power is consequently wasted to emit flash light. On the other hand, in the technique described in Japanese Patent Laid-Open No. 10-274802, an image sensing operation does not actually start unless a release signal from the remote controller reaches the image sensing apparatus, even after completion of playback of a self-timer voice. Also, in the technique described in Japanese Patent Laid-Open No. 2000-19629, since identical bleep tones are generated until the last beep tone indicating the end of the release wait time is generated, the user who has already experienced several image sensing operations using a self timer only knows the number of bleep tones generated until the last beep tone is generated, and it is difficult to determine the timing until actual release, resulting in poor usability.

For this reason, for example, if there are many objects upon taking a ceremonial photo, some objects may close eyes or look away at the image sensing timing. In the method of notifying the release timing of the image sensing apparatus by emitting flash light, electric power is consequently wasted to emit flash light. Furthermore, in the method of audibly notifying the release timing on the image sensing apparatus side, an object cannot hear tones generated by the image sensing apparatus in a noisy environment. Also, there is no technique that notifies the user of a release timing while monitoring an image to be sensed, resulting in poor usability.

SUMMARY OF THE INVENTION

Accordingly, an object of the present invention is to adequately notify the user of the release timing of the image sensing apparatus side using a remote controller. Another object of the present invention is to allow the user to confirm the release timing while monitoring an image to be sensed using a remote controller.

According to the present invention, the foregoing object is attained by providing an image sensing system which includes an image sensing apparatus, and a remote controller for remote-controlling the image sensing apparatus, the image sensing apparatus comprising: input means for inputting an image; and transmission means for transmitting the image input from the input means, and an image sensing timing notification information associated with an image sensing timing to the remote controller, and the remote controller comprising control means for controlling to display the image transmitted from the image sensing apparatus, and to notify the image sensing timing in correspondence with contents of the image sensing timing notification information transmitted from the image sensing apparatus.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will now be described in detail with reference to the drawings. It should be noted that the relative arrangement of the components, the numerical expressions, numerical values, order of processes, display screen images, and the like, set forth in these embodiments do not limit the scope of the present invention unless it is specifically stated otherwise.

First Embodiment

Figure 1:
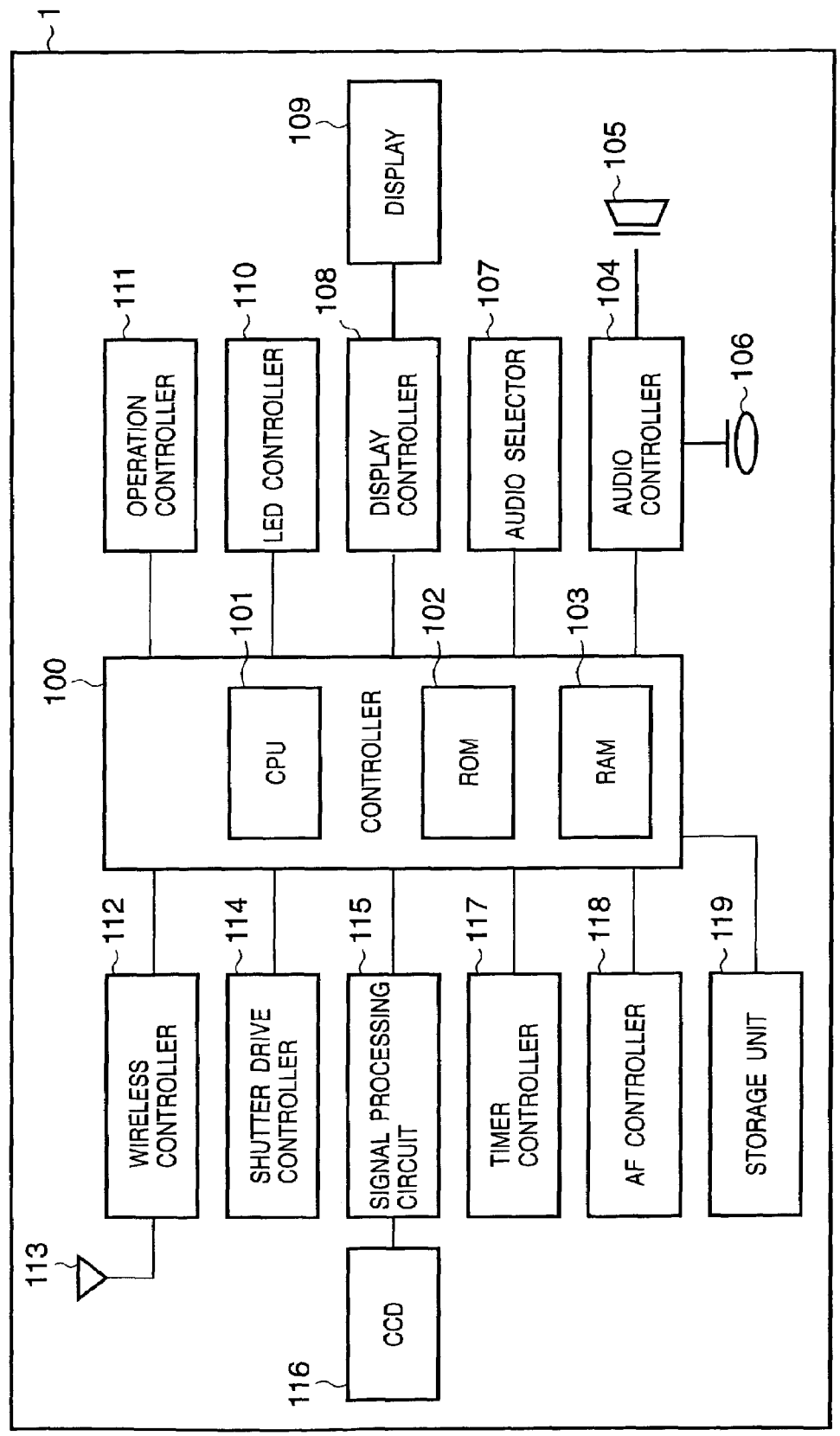
FIG. 1 is a block diagram showing a feature of a digital camera according to the first embodiment of the present invention.

FIG. 1 is a block diagram of a digital camera 1 which can be applied to an image sensing system according to the first embodiment of the present invention. Note that the digital camera 1 may be a digital video camera or the like other than cameras dedicated to take digital still photos. Also, a mobile phone, PDA(Personal Digital Assistance), or the like with a camera function may be used as long as it can sense an image using a so-called self timer.

Reference numeral 100 denotes a controller of the digital camera, which includes a CPU 101, ROM 102, and RAM 103. Reference numeral 104 denotes an audio controller that encodes and A/D-converts audio data, and controls a loudspeaker 105 and microphone 106. Reference numeral 107 denotes an audio selector for selecting various kinds of audio information; 108, a display controller for controlling a display 109; and 110, an LED controller. Reference numeral 111 denotes an operation controller for controlling various operations; 112, a wireless controller which includes an RF unit and baseband processor used to transmit/receive wireless communication signals; 113, an antenna; and 114, a shutter drive controller for driving a shutter upon release. Reference numeral 115 denotes a signal processing circuit for processing an image signal from a CCD 116; 117, a timer controller for making control associated with a timer process; 118, an AF controller for controlling AF; and 119, a storage unit for storing image information and the like.

Figure 2:
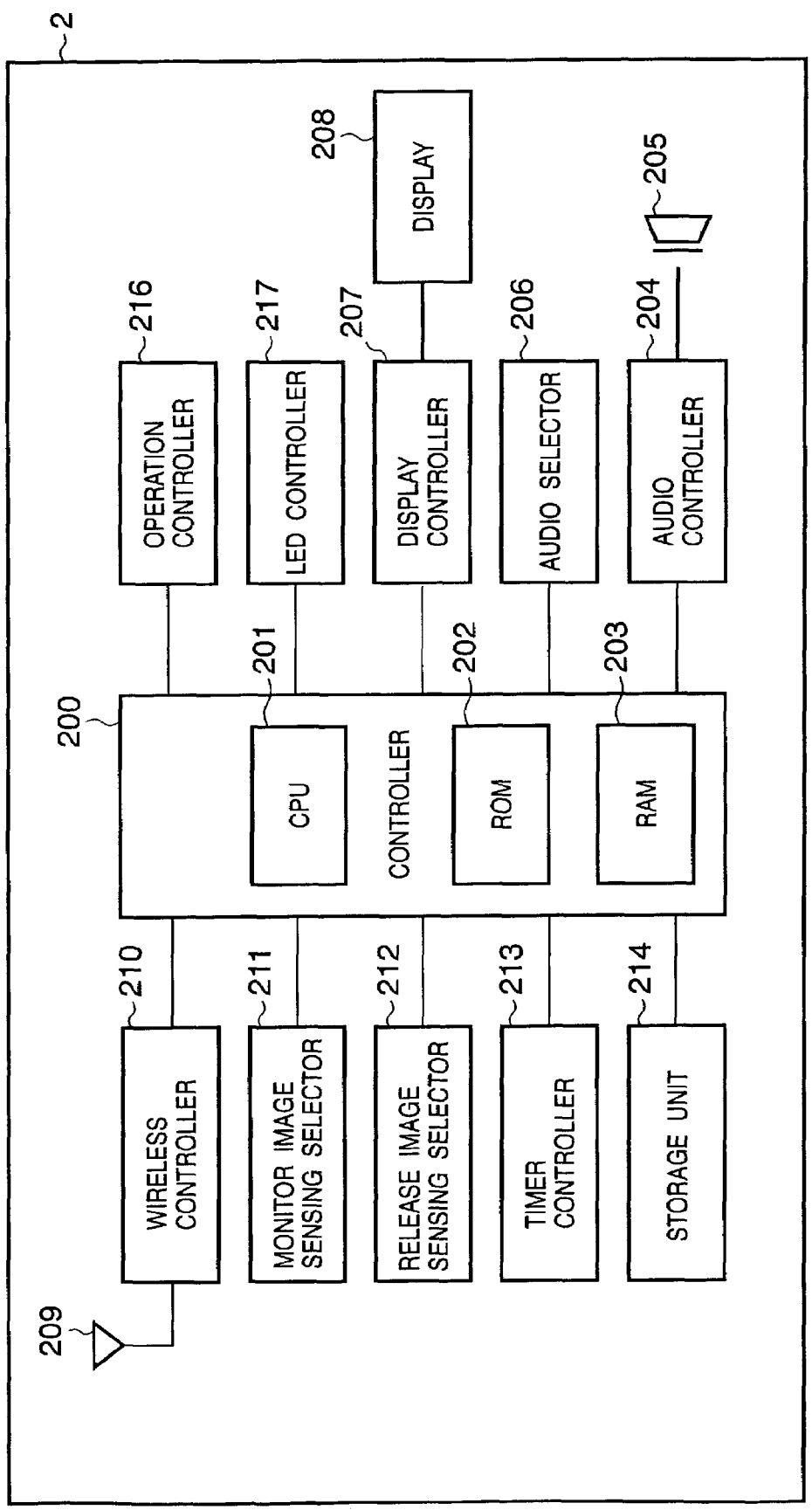
FIG. 2 is a block diagram showing a feature of a remote controller according to the first embodiment of the present invention.

FIG. 2 is a block diagram of a remote controller 2 which can be applied to the image sensing system according to the first embodiment of the present invention. The remote controller 2 can remote control the digital camera 1 via wireless communications.

As the remote controller 2, a mobile phone, portable terminal such as PDA, or the like independent from the digital camera 1 may be used in addition to a device as an accessory of the digital camera 1. In the remote controller 2, reference numeral 200 denotes a controller of the remote controller, which includes a CPU 201, ROM 202, and RAM 203. Reference numeral 204 denotes an audio controller which encodes and A/D-converts audio data, and controls a loudspeaker 205; 206, an audio selector for selecting various kinds of audio information; and 207, a display controller for controlling a display 208. Reference numeral 210 denotes a wireless controller which includes an RF unit and baseband processor used to transmit/receive wireless communication signals; 209, an antenna; and 211, a monitor image sensing selector which executes a process when a monitor image sensing mode is selected as an image sensing mode. Reference numeral 212 denotes a release image sensing selector which executes a process when a release image sensing mode is selected as an image sensing mode; 213, a timer controller for making control associated with a timer process; 214, a storage unit for storing image information and the like; 216, an operation controller for controlling various operations; and 217, an LED controller for controlling LEDs.

Figure 3:
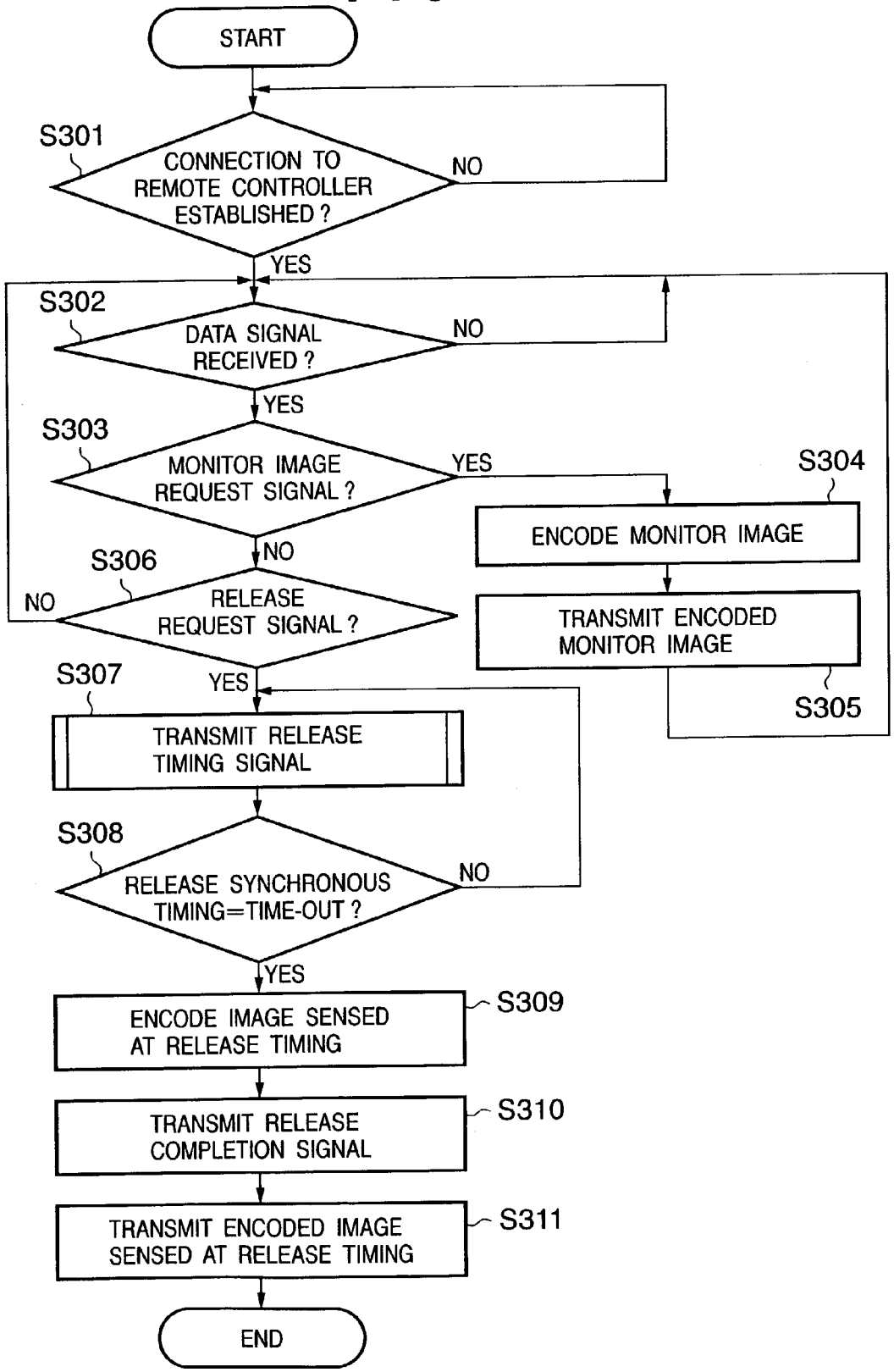
FIG. 3 is a flow chart showing the operation of the digital camera according to the first embodiment of the present invention.
Figure 9:
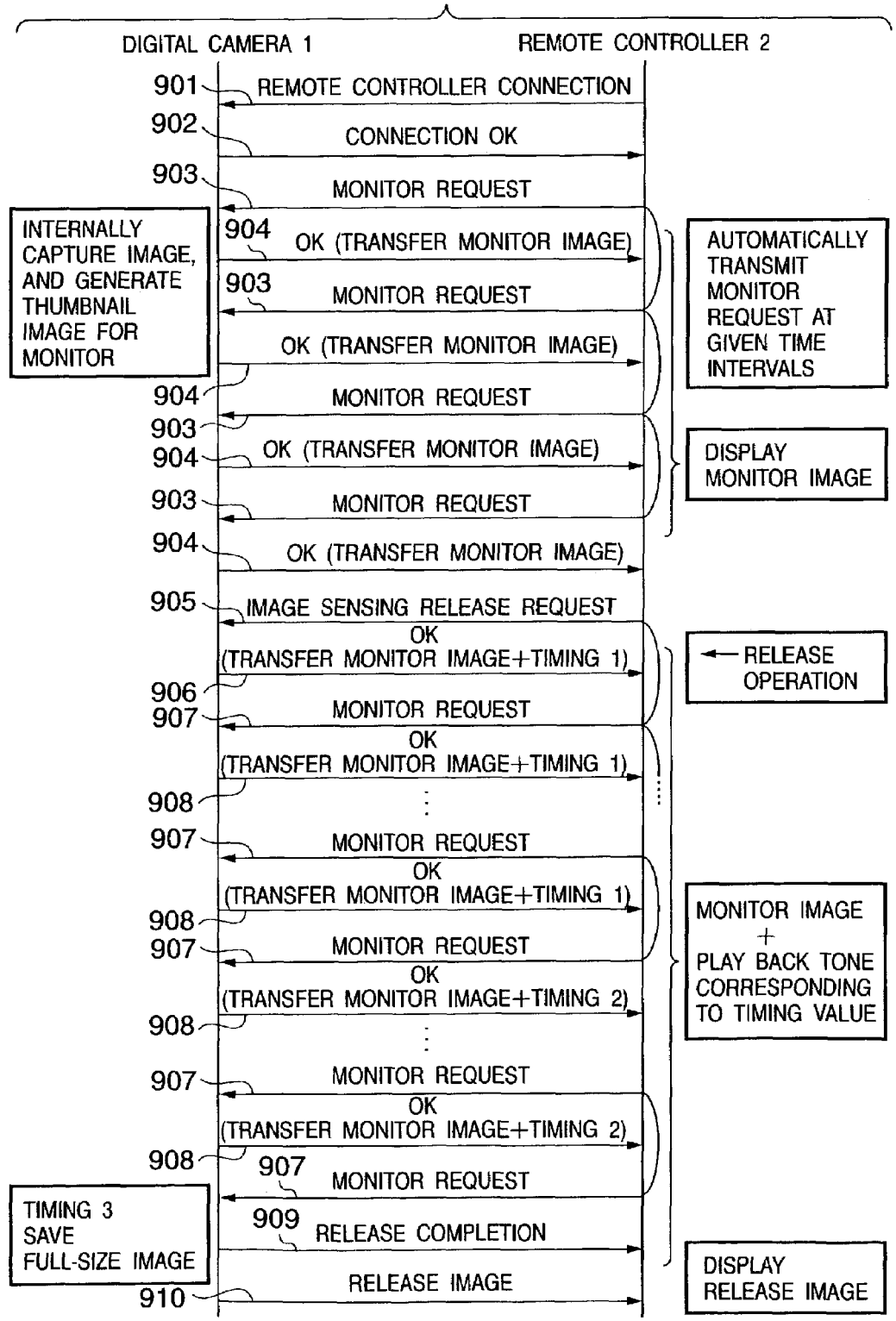
FIG. 9 is a sequence chart showing the operations between the digital camera and remote controller according to the first embodiment of the present invention.

FIG. 3 is a flow chart showing the process in the digital camera 1 executed when the digital camera 1 makes wireless communications with the wireless controller 210 in the remote controller 2 via the wireless controller 112. FIG. 9 is a sequence chart showing the operations between the digital camera 1 and remote controller 2.

Upon reception of a wireless connection request from the remote controller 2 (901), the digital camera 1 returns a connection permission (902) to the remote controller 2 to establish wireless communication connection between the digital camera 1 and remote controller 2 (S301). When the digital camera 1 and remote controller 2 are ready to make data communications, the flow advances to step S302, and the digital camera 1 waits for a data signal received from the remote controller 2. Upon reception of a data signal, the flow advances to step S303 to check if the received signal contains a signal (903) that indicates a monitor image request. If the received signal contains a signal (903) that indicates a monitor image request, the flow advances to step S304, and the signal processing circuit 115 encodes an input signal of an image currently sensed by the CCD 116. The flow then advances to step S305 to transmit the encoded image (904) as a monitor image via the wireless controller 112. On the other hand, if it is determined in step S303 that the received signal does not contain any signal (903) that indicates a monitor image request, it is checked whether or not the received signal contains signal (905) that indicates a release request (S306). If the received signal contains signal (905) that indicates a release request, the flow advances to step S307, and a monitor image obtained by encoding an input signal of an image currently sensed by the CCD 116 and a timing value (906) until the release timing of the digital camera 1 are transmitted. After reception of the first release request signal, a monitor image and timing value are transmitted every time a monitor request signal is received, until an image sensing operation is made.

The timing value is a value ranging from 0 to N (positive integer), and represents a time until the shutter is actually released. The CPU 101 increments the timing value stored in the RAM 103 at given time intervals, and senses an image when the timing value has reached N. In this case, the timing value is incremented from 0 to N. Alternatively, the timing value may be decremented from N to 0, and an image sensing operation may be made when the timing value has reached 0. The timing value has a meaning equivalent to an audible cue (e.g., "3 (three), 2 (two), 1 (one), shoot", or the like) that the photographer says to an object upon taking a photo. In this embodiment, the timing value is incremented from 1 to 3, and an image sensing operation is made when the timing value has reached 3.

After the timing value is transmitted, the flow advances to step S308 to check if a release synchronous timing (image sensing timing) has been reached. If the release synchronous timing has not been reached yet, the flow returns to step S307 to transmit a monitor image and timing value in response to the next monitor request signal. A monitor image and timing value are repetitively transmitted (907) until the release synchronous timing is reached.

If the release synchronous timing has been reached, the flow advances to step S309, the shutter drive controller 114 releases the shutter, and a sensed image is encoded. After that, the flow advances to step S310, and a signal (909) indicating completion of release is transmitted to the remote controller 2. Furthermore, upon completion of encoding of the image sensed at the release timing, the flow advances to step S311, and the encoded image sensed at the release timing (sensed image) (910) is transmitted to the remote controller 2.

Figure 4:
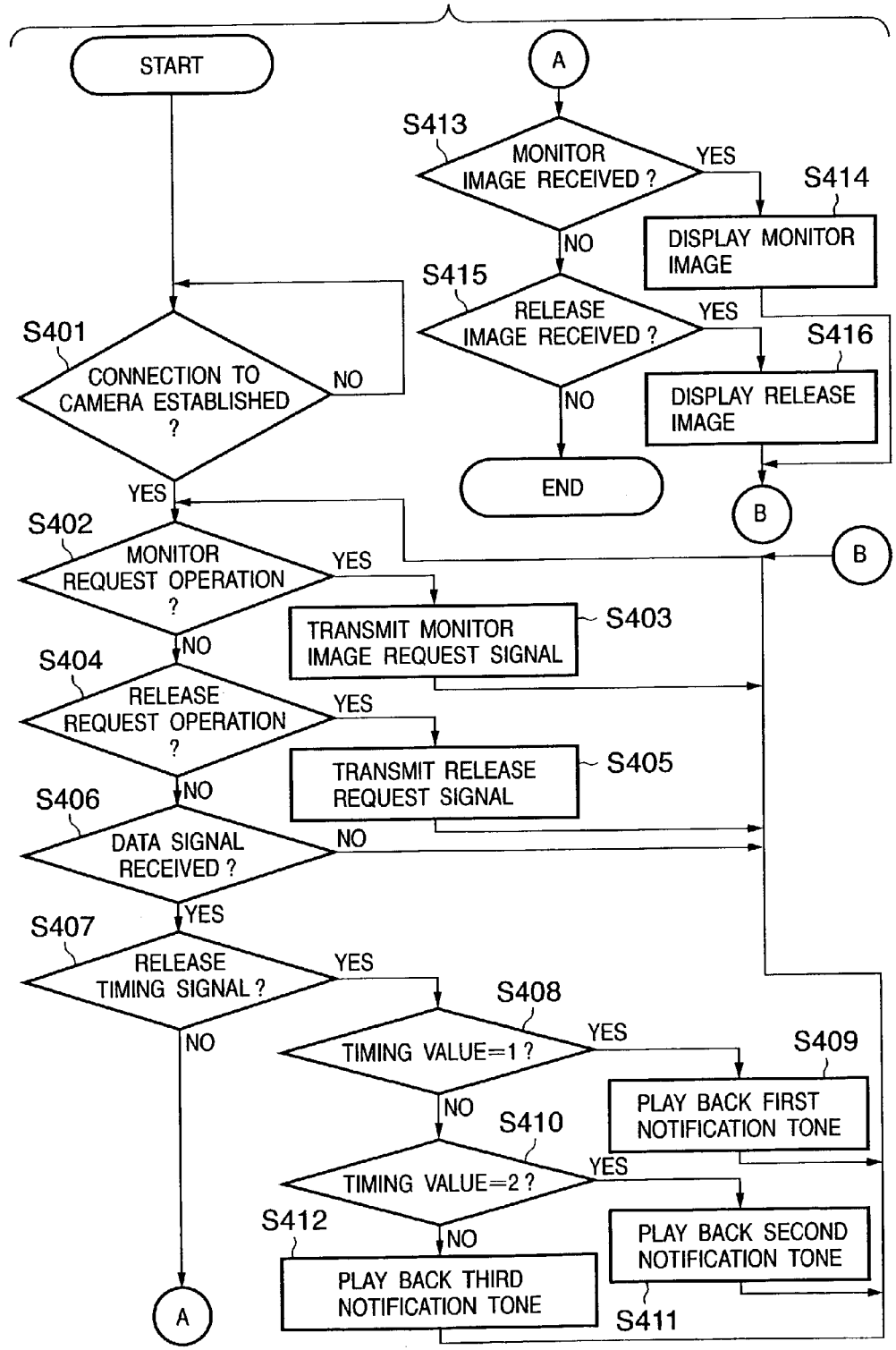
FIG. 4 is a flow chart showing the operation of the remote controller according to the first embodiment of the present invention.

FIG. 4 is a flow chart showing the process in the remote controller 2 executed when the remote controller 2 makes wireless communications with the wireless controller 112 of the digital camera 1 via the wireless controller 210.

When the remote controller 2 transmits a wireless connection request (901) to the digital camera 1 and receives a connection permission (902) returned from the digital camera 1, wireless communication connection is established between the digital camera 1 and remote controller 2 in step S401. In this manner, the digital camera 1 and remote controller 2 are ready to make data communications. In step S402, the remote controller 2 waits for an operation input from the operation controller 216. If a monitor request operation is detected, the flow advances to step S403 to transmit a monitor image request signal (903) to the digital camera 1.

When the user has made the monitor request operation, a monitor image request signal is periodically transmitted until he or she makes a monitor end operation.

If a release request operation is detected, the flow advances from step S404 to step S405 to transmit a release request signal (905). After the release request signal is transmitted, the flow advances to step S406. When the user has made the release request operation and the remote controller transmits the release request signal (905) to the digital camera 1 in step S405, the remote controller 2 periodically transmits a monitor image request signal to the digital camera 1 until it receives a release completion signal from the digital camera 1. This process is executed even when the user has not made any monitor request operation. In this manner, the user can confirm the release timing while confirming a monitor image, as will be described later, even when he or she has not made any monitor request operation.

In step S406, the remote controller 2 waits for a data signal received from the digital camera 1. If the data signal is a release timing signal (906, 908) sent together with a monitor image, the flow advances from step S407 to step S408 to confirm a timing value contained in that signal.

If the timing value (906, 908) is 1, the flow advances from step S408 to step S409. In step S409, the monitor image received together with this timing value is displayed on the display 208, the audio selector 206 selects a first notification tone indicating the timing value "1", and the audio controller 204 encodes an audio signal and plays it back via the loudspeaker 205. On the other hand, if the timing value is 2, the flow advances from step S408 to step S411 via step S410. In step S411, the monitor image received together with this timing value is displayed on the display 208, and a second notification tone indicating the timing value "2" is selected and played back. If the timing value is neither 1 nor 2, the flow advances to step S412. In step S412, it is determined that an actual release timing has been reached, and a third notification tone (shutter tone) is played back.

If the received data is a monitor image (904) which does not contain any timing value, the flow advances from step S413 to step S414 to display the monitor image without playing back any notification tone. If a release image is received, the flow advances from step S415 to step S416 to display the release image.

Note that the timing value may be transmitted as data independent from a monitor image, or may be transmitted as additional data of a monitor image, as long as the timing value can be confirmed on the remote controller 2 side. When the timing value is transmitted as data independent from a monitor image, the time required until a monitor image is displayed can be shortened. On the other hand, when the timing value is transmitted as additional data, a monitor image corresponding to that timing value can be easily recognized.

As described above, according to this embodiment, when the digital camera is remote-controlled by the remote controller, the remote controller notifies the user of the actual release timing on the digital camera side by playing back a notification tone while displaying a monitor image. Hence, an object on the remote controller side can adequately recognize a shutter timing while confirming a monitor image. Since the tone indicating the timing value changes depending on timings, the user can easily determine a timing until release.

Note that the user may freely change notification tones corresponding to timing values. In this case, the remote controller may include Internet connection means, and may download notification tones from the Internet, or may receive notification tone data transmitted from the digital camera 1 via wireless communications such as Bluetooth or the like. If the user can freely change notification tones, the user's convenience can be further improved.

Second Embodiment

An image sensing system according to the second embodiment of the present invention will be described below. In the first embodiment, the digital camera 1 transmits a plurality of timing values to the remote controller 2 every time each timing value is required. However, in this embodiment, information indicating a release timing is transmitted only once. Since other arrangements and operations are the same as those in the first embodiment, the same reference numerals denote the same components or processes, and a description thereof will be omitted.

Figure 5:
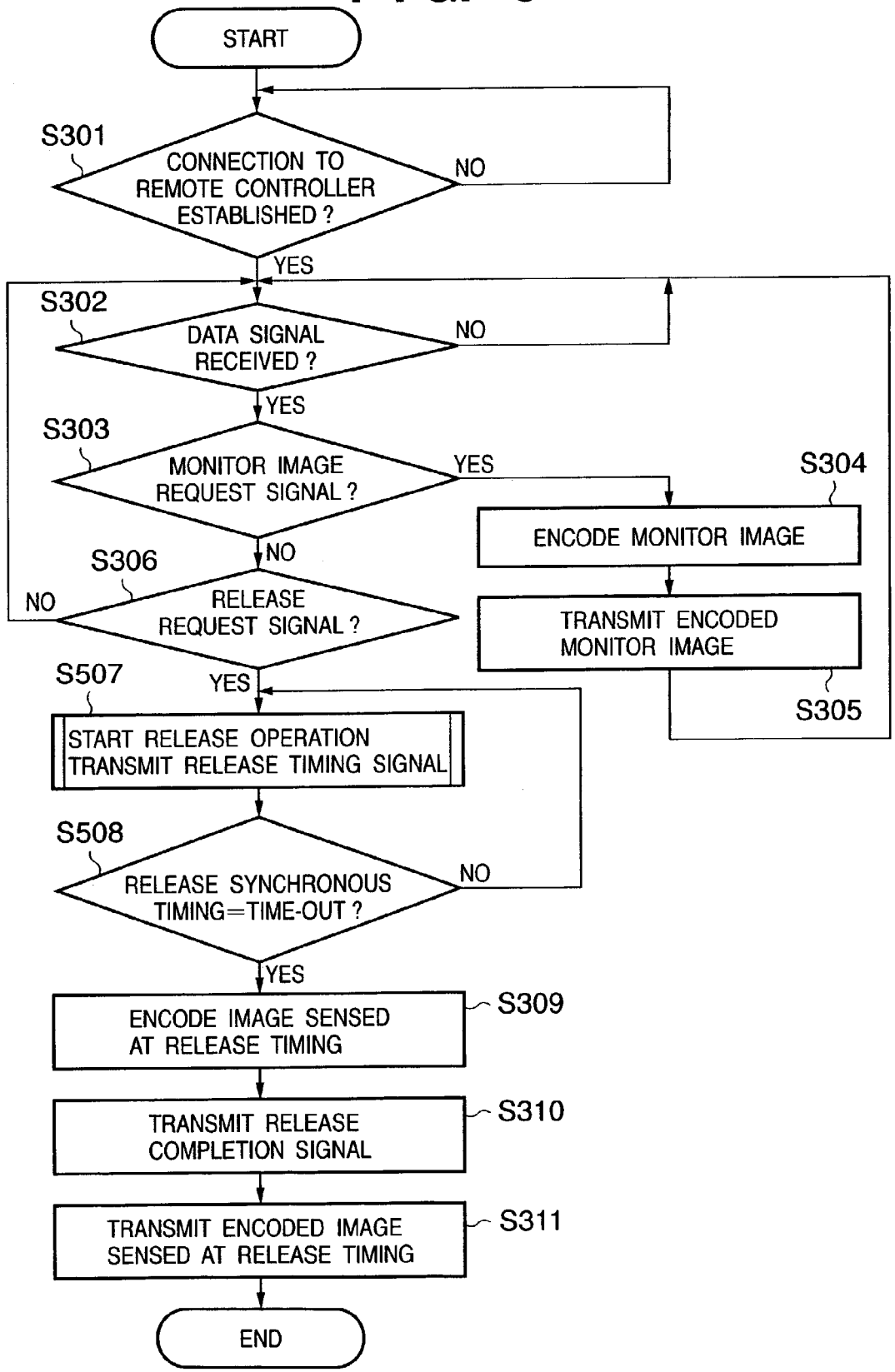
FIG. 5 is a flow chart showing the operation of a digital camera according to the second embodiment of the present invention.

FIG. 5 is a flow chart showing the process in the digital camera 1 executed when the digital camera 1 according to this embodiment makes wireless communications with the wireless controller 210 of the remote controller 2 via the wireless controller 112. Processes in steps S507 and S508 are different from FIG. 3.

If the digital camera 1 receives a signal indicating a release request in step S306, the flow advances to step S507 to transmit timing information until release to the remote controller 2 together with a monitor image. The flow advances to step S508, and the digital camera 1 counts down transmitted release timing N until it becomes 0. If the release timing has become 0, the flow advances to step S309, and the digital camera 1 releases the shutter.

If a monitor request is received from the remote controller 2 after the timing information has been transmitted to the remote controller 2 in step S507, a monitor image is transmitted to the remote controller 2 without any timing information.

Figure 6:
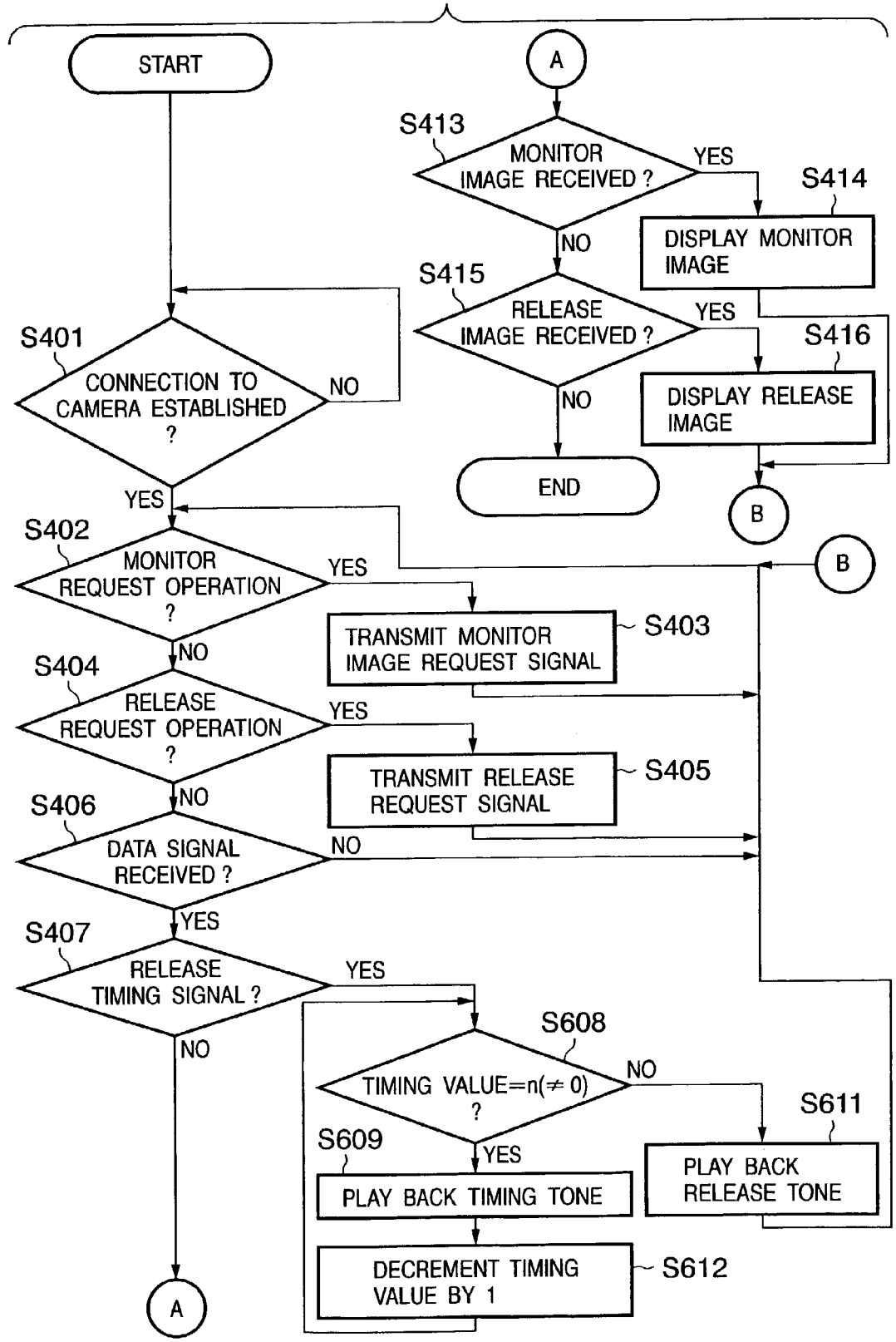
FIG. 6 is a flow chart showing the operation of a remote controller according to the second embodiment of the present invention.

FIG. 6 is a flow chart showing the process in the remote controller 2 executed when the remote controller 2 according to this embodiment makes wireless communications with the wireless controller 112 of the digital camera 1 via the wireless controller 210. Processes in steps S608 to S612 are different from FIG. 4.

If it is determined in step S407 that a data signal received from the digital camera 1 is release timing information, the flow advances from step S407 to step S608 to confirm whether or not the timing value contained in that information is 0. If the timing value is not 0, the flow advances to step S609. In step S609, a monitor image received together with the timing information is displayed on the display 208, and a timing tone corresponding to that timing value is played back. The flow then advances to step S612 to decrement the timing value. After that, every time a monitor image is received, that monitor image is displayed, and a timing tone corresponding to the timing value decremented in step S612 is played back. This process is repeated to display a monitor image and to play back a timing tone until the timing value becomes 0. If the timing value has become 0, since an actual image sensing operation is done on the digital camera 1 side, the flow advances from step S608 to step S611 to play back a release tone (shutter tone).

In this manner, since the shutter release timing can be independently adjusted on the digital camera 1 side and remote controller 2 side, wireless resources need not be used to notify a timing, thus achieving power savings in both the digital camera 1 and remote controller 2.

In this embodiment, a timing notification value is contained in a release timing signal. Alternatively, in negotiation upon establishing wireless communication connection, the timings on the digital camera side and remote controller side may be adjusted as well as a delay caused by wireless communications. In this way, synchronization between the digital camera 1 and remote controller 2 can be achieved more accurately.

Third Embodiment

An image sensing system according to the third embodiment of the present invention will be described below. In the first embodiment, the digital camera 1 transmits a plurality of timing values to the remote controller 2 every time each timing value is required. However, in this embodiment, information indicating a timer time until release is transmitted only once. Since other arrangements and operations are the same as those in the first embodiment, the same reference numerals denote the same components or processes, and a description thereof will be omitted. Note that the timing value of the first embodiment is different from the timer value of this embodiment since the timing value is a relative value, and the timer value represents an absolute time. In this embodiment, the digital camera 1 notifies the remote controller 2 of the timer value until release, and the remote controller 2 plays back music used to notify a release timing, which is prepared in advance, on the basis of that time.

Figure 7:
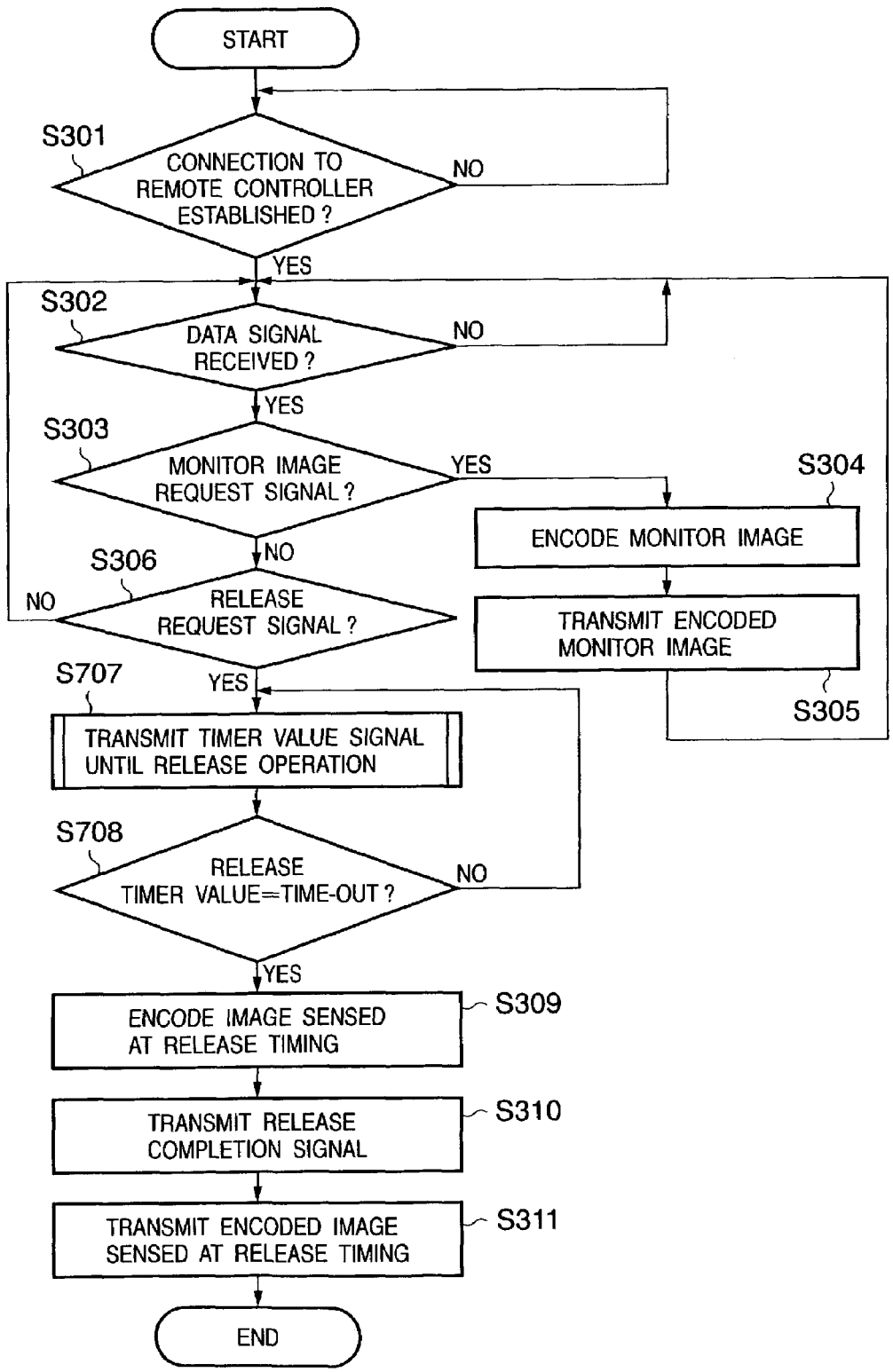
FIG. 7 is a flow chart showing the operation of a digital camera according to the third embodiment of the present invention.

FIG. 7 is a flow chart showing the process in the digital camera 1 executed when the digital camera 1 according to this embodiment makes wireless communications with the wireless controller 210 of the remote controller 2 via the wireless controller 112. Processes in steps S707 and S708 are different from FIG. 3.

If the digital camera 1 receives a signal indicating a release request in step S306, the flow advances to step S707 to transmit information which indicates a remaining time until release to the remote controller 2. The flow advances to step S708, and the digital camera 1 waits until the transmitted release timer (remaining time) reaches a time-out (becomes 0). After the time-out has been reached, the digital camera 1 releases the shutter in step S309. In this embodiment as well, even after the information indicating the remaining time until release is transmitted, the digital camera 1 periodically receives a monitor image request from the remote controller 2, and transmits a monitor image in response to that request.

Figure 8:
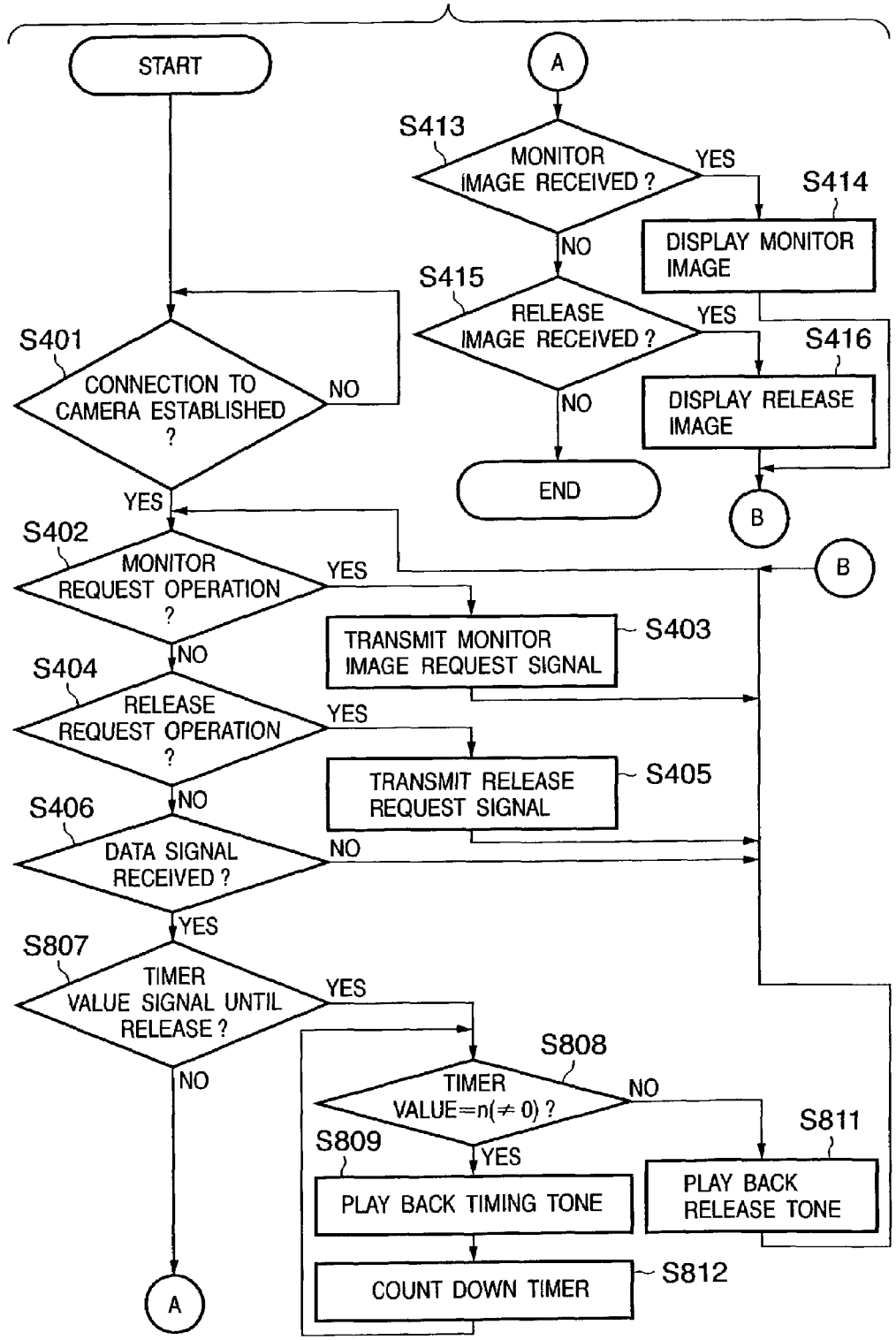
FIG. 8 is a flow chart showing the operation of a remote controller according to the third embodiment of the present invention.

FIG. 8 is a flow chart showing the process in the remote controller 2 executed when the remote controller 2 according to this embodiment makes wireless communications with the wireless controller 112 of the digital camera 1 via the wireless controller 210. Processes in steps S807 to S812 are different from FIG. 4.

The remote controller 2 waits for a data signal received from the digital camera 1. If a data signal is a release timer signal, the flow advances from step S807 to step S808 to confirm the remaining time contained in that signal. If the remaining time is not 0, the flow advances to step S809 to play back a timing tone corresponding to the remaining time. In step S812, the remaining time is decremented as in the digital camera 1, and if a predetermined time (e.g., 1 sec) has elapsed, the flow returns to step S808. If the remaining time has become 0, a release tone is played back (S811).

By applying the aforementioned arrangement, the user can freely set his or her a favorite tone and music as a timing tone (and release tone) at the remote controller 2. In this case, the remote controller 2 preferably notifies the digital camera 1 of a duration of the timing tone to be played back until release, and the digital camera 1 preferably sets the timer value in correspondence with the received duration of the timing tone. With this arrangement, the remote controller user can uniquely set a timing tone.

Fourth Embodiment

An image sensing system according to the fourth embodiment of the present invention will be described below. In the first embodiment, only one communication link is established between the digital camera 1 and remote controller 2 to transmit a monitor image and timing value via that link. However, when a monitor image and timing value are to be simultaneously transmitted as independent data, the digital camera 1 spends much time to encode a monitor image, and cannot often transmit a timing value until the monitor image is generated. When a timing value is transmitted at a low communication rate after a monitor image is transferred, much time is spent to transfer the monitor image, and the timing value cannot often be appropriately transmitted.

Hence, in this embodiment, a control data link used to transmit a timing value is established independently of a link used to transmit a monitor image.

Figure 10:
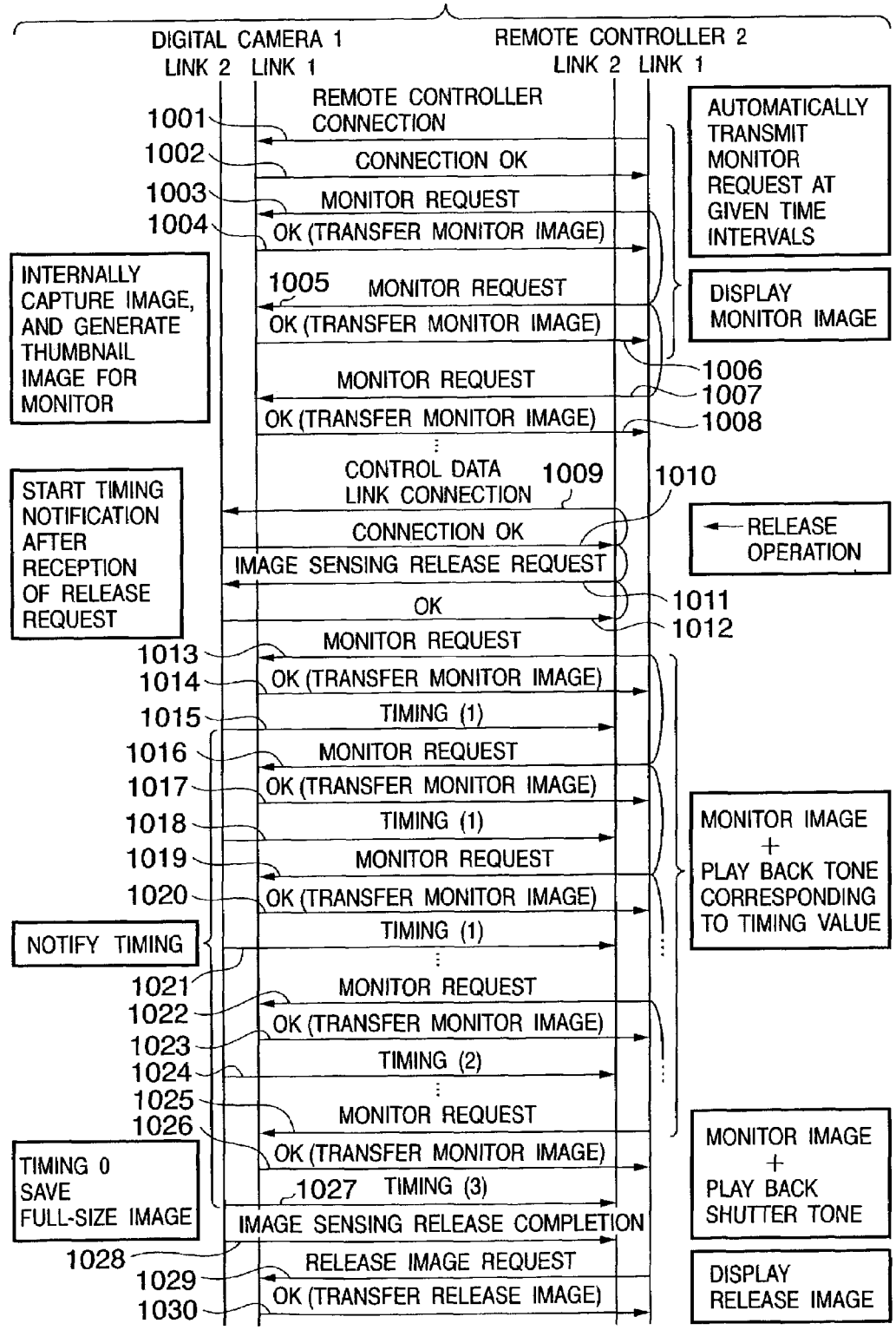
FIG. 10 is a sequence chart showing the operations between a digital camera and remote controller according to the fourth embodiment of the present invention.

FIG. 10 is a sequence chart showing the operations between the digital camera 1 and remote controller 2. A description of the same contents as in the first embodiment will be omitted.

Figure 11:
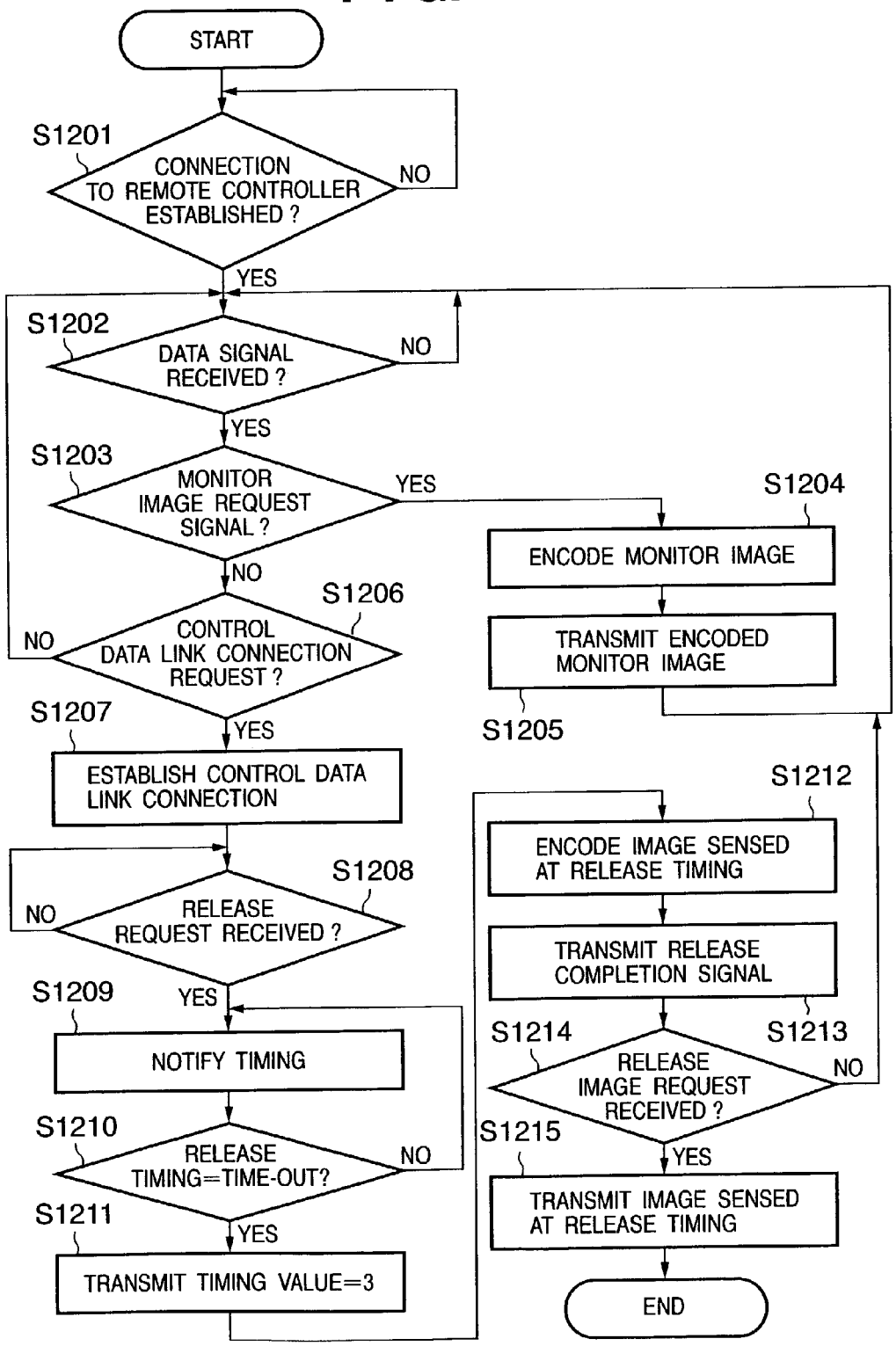
FIG. 11 is a flow chart showing the operation of the digital camera according to the fourth embodiment of the present invention.

FIG. 11 is a flow chart showing the process in the digital camera 1 executed when the digital camera 1 makes wireless communications with the wireless controller 210 of the remote controller 2 via the wireless controller 112.

Figure 12A:
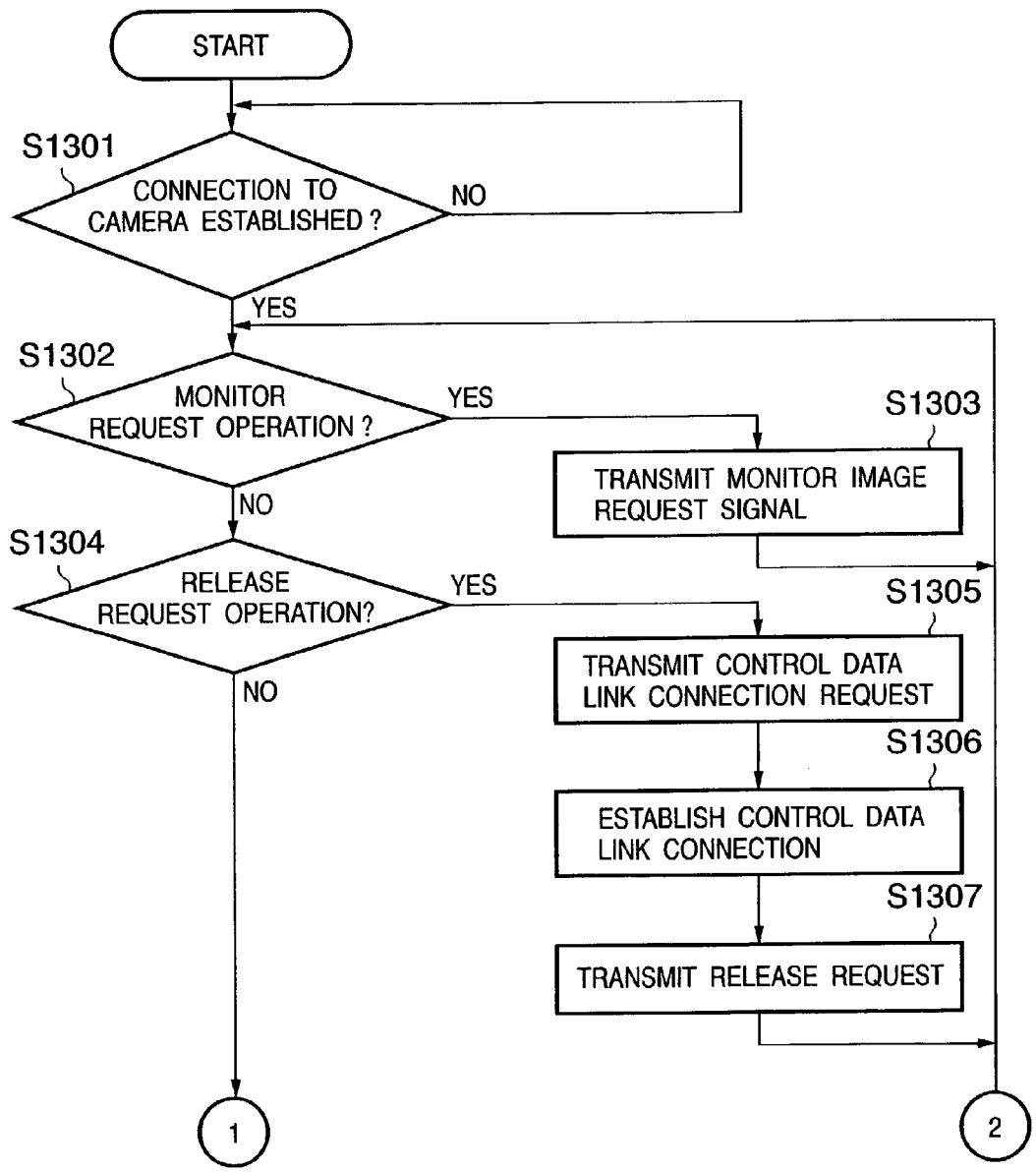
FIGS. 12A and 12B are flow charts showing the operation of the remote controller according to the fourth embodiment of the present invention.
Figure 12B:
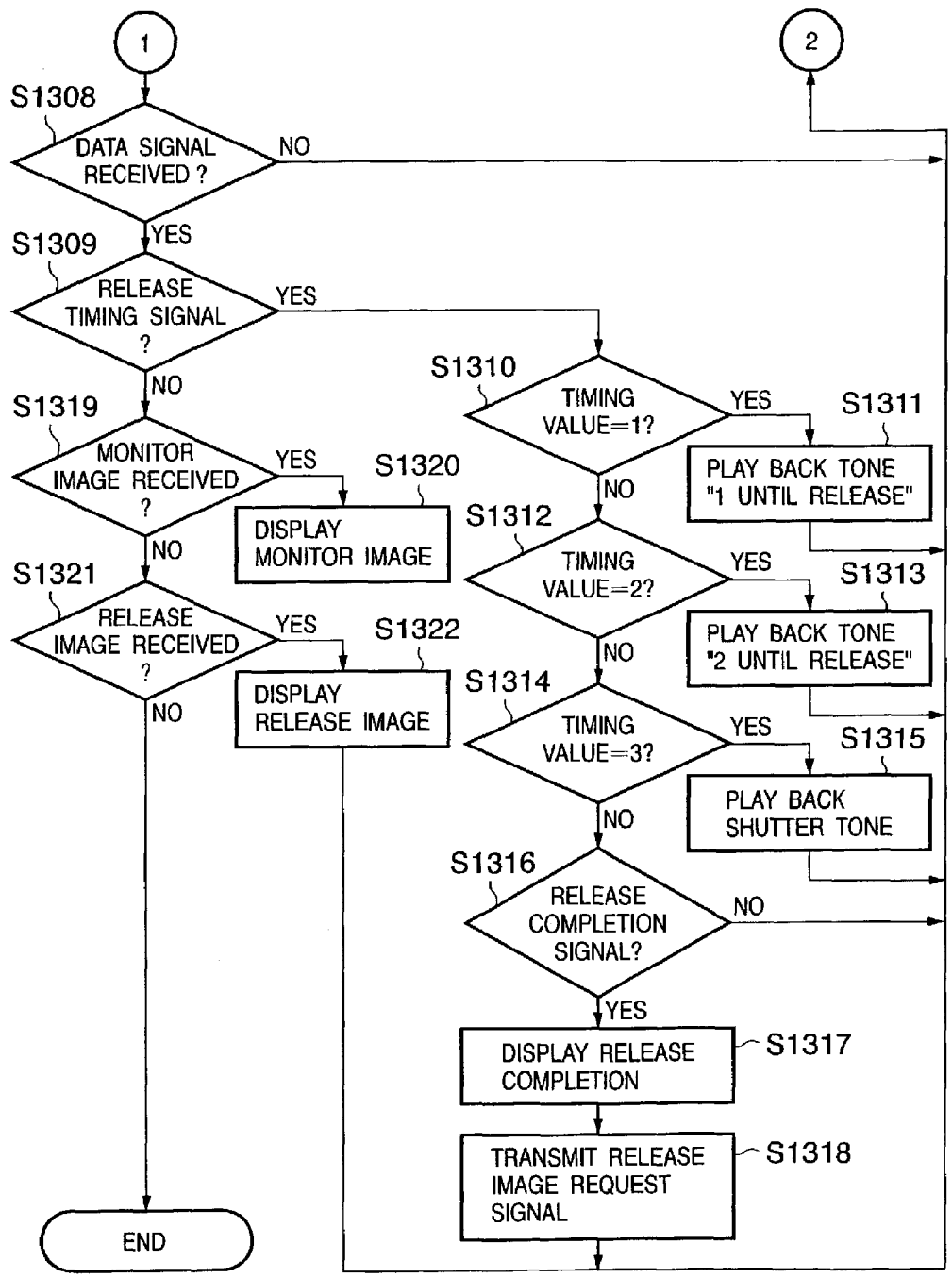

FIGS. 12A and 12B are flow charts showing the process in the remote controller 2 executed when the remote controller 2 makes wireless communications with the wireless controller 112 of the digital camera 1 via the wireless controller 210.

This embodiment will be explained below using FIGS. 10, 11, and 12A and 12B.

Upon reception of a wireless connection request from the remote controller 2 (1001), the digital camera 1 returns a connection permission (1002) to the remote controller 2 to establish wireless communication connection link 1 between the digital camera 1 and remote controller 2 (steps S1201 and S1301).

With this link 1, the digital camera 1 generates and transfers a monitor image in response to a monitor request from the remote controller 2. That is, the flow advances to step S1302 in FIG. 12A, and the remote controller 2 waits for an operation input from the operation controller 216. Upon detection of a monitor request operation, the flow advances to step S1303, and the remote controller 2 transmits a monitor image request signal (1003) to the digital camera 1. After that, the remote controller 2 periodically transmits a monitor image request signal (1005, 1007, 1013, 1016, 1019, 1022, 1025) until a monitor end operation is made.

The digital camera 1 waits for a data signal from the remote controller 2 in step S1202 in FIG. 11. Upon reception of the monitor request signal (1003) (step S1203), the signal processing circuit 115 encodes an input signal of an image currently sensed by the CCD 116. The flow advances to step S1204 to transmit the encoded image (1004) as a monitor image via the wireless controller 112. After that, every time a monitor image request signal (1005, 1007, 1013, 1016, 1019, 1022, 1025) is received, the digital camera 1 encodes an input signal of an image currently sensed by the CCD 116 using the signal processing circuit 115. Then, the digital camera 1 transmits the encoded monitor image (1006, 1008, 1014, 1017, 1020, 1023, 1026) to the remote controller 2 via the wireless controller 112. The remote controller 2 monitors a data signal from the digital camera 1 (step S1308). Upon receiving a monitor image (step S1319), the remote controller 2 displays the received monitor image.

If the remote controller 2 confirms in step S1304 that a release request operation has been made from the operation controller 216, it requests the digital camera 1 to establish control data link connection (1009, step S1305). Upon reception of this request in step S1206, the digital camera 1 replies "connection OK" (1010). Then, control data link 2 is established between the digital camera 1 and remote controller 2 (steps S1207 and S1306). Upon establishment of the control data link, the remote controller 2 sends an image sensing release request to the digital camera 1 (1011, step S1307). Upon reception of this request, the digital camera 1 replies "OK" (1012, step S1208), and starts timing notification until release at the same time (1015, step S1209). Even during control of link 2, the remote controller 2 transmits a monitor image request to the digital camera 1 (1013), and the digital camera 1 transmits a monitor image (1014). Upon reception of the monitor image, the remote controller displays that monitor image on the display 208. After that, the digital camera 1 periodically transmits timing signals until release via link 2 (1018, 1021, 1024, 1027).

The remote controller 2 monitors a data signal from the digital camera 1 (step S1308). Upon detection of a release timing signal, the flow advances to step S1310. If the received timing signal is "1" (1015, 1018, 1021), the flow advances from step S1310 to step S1311, and the audio selector 206 selects a notification tone indicating "1" until release. The audio controller 204 encodes an audio signal, and plays it back via the loudspeaker 205.

Likewise, if the received timing signal is "2" (1024), the flow advances from step S1312 to step S1313. In step S1313, the audio selector 206 selects a notification tone indicating 2 until release, and the audio controller 204 encodes an audio signal and plays it back via the loudspeaker 205.

If the received timing signal is "3" (1027), the flow advances from step S1314 to step S1315. In step S1315, the audio selector 206 selects a notification tone indicating a shutter tone, and the audio controller 204 encodes an audio signal and plays it back via the loudspeaker 205.

On the other hand, the digital camera 1 monitors whether or not a release synchronous timing has been reached (step S1210), while periodically transmitting a timing signal in step S1209. If the release synchronous timing has been reached, the digital camera 1 transmits a timing signal "3" in step S1211. The shutter drive controller 114 releases the shutter, and a sensed image is encoded. Also, the digital camera 1 notifies the remote controller 2 of completion of image sensing release (1028, step S1213).

Upon reception of an image sensing release completion signal (1028) (step S1316), the remote controller 2 displays "complete" on the display 208 (S1317), and then transmits a release image request signal (1029) to the digital camera 1 (step S1318).

Upon reception of this request, the digital camera 1 transmits a release image to the remote controller 2 (1030), steps S1214 and S1215). Upon receiving the release image (step S1321), the remote controller 2 displays that image on the display 208 (step S1322).

In the above description, the digital camera 1 transmits timing signals at given periods, but may transmit a timing signal only when a timing value is updated. With this control, traffic on control data link 2 can be reduced.

As described above, according to this embodiment, since the wireless link used to transmit/receive control information such as a timing signal and the like, and that for image data are independently controlled, timing signals can be transmitted independently of the image encoding performance of the digital camera 1, thus improving the release timing precision.

Fifth Embodiment

An image sensing system according to the fifth embodiment of the present invention will be described below. In the first embodiment, the remote controller notifies the user of an actual release timing on the digital camera by playing back a notification tone, while displaying a monitor image. However, in this embodiment, the remote controller notifies the user of an actual release timing on the digital camera by displaying it together with a monitor image. Since other arrangements and operations are the same as those in the first embodiment, the same reference numerals denote the same components or processes, and a description thereof will be omitted.

Figure 13:
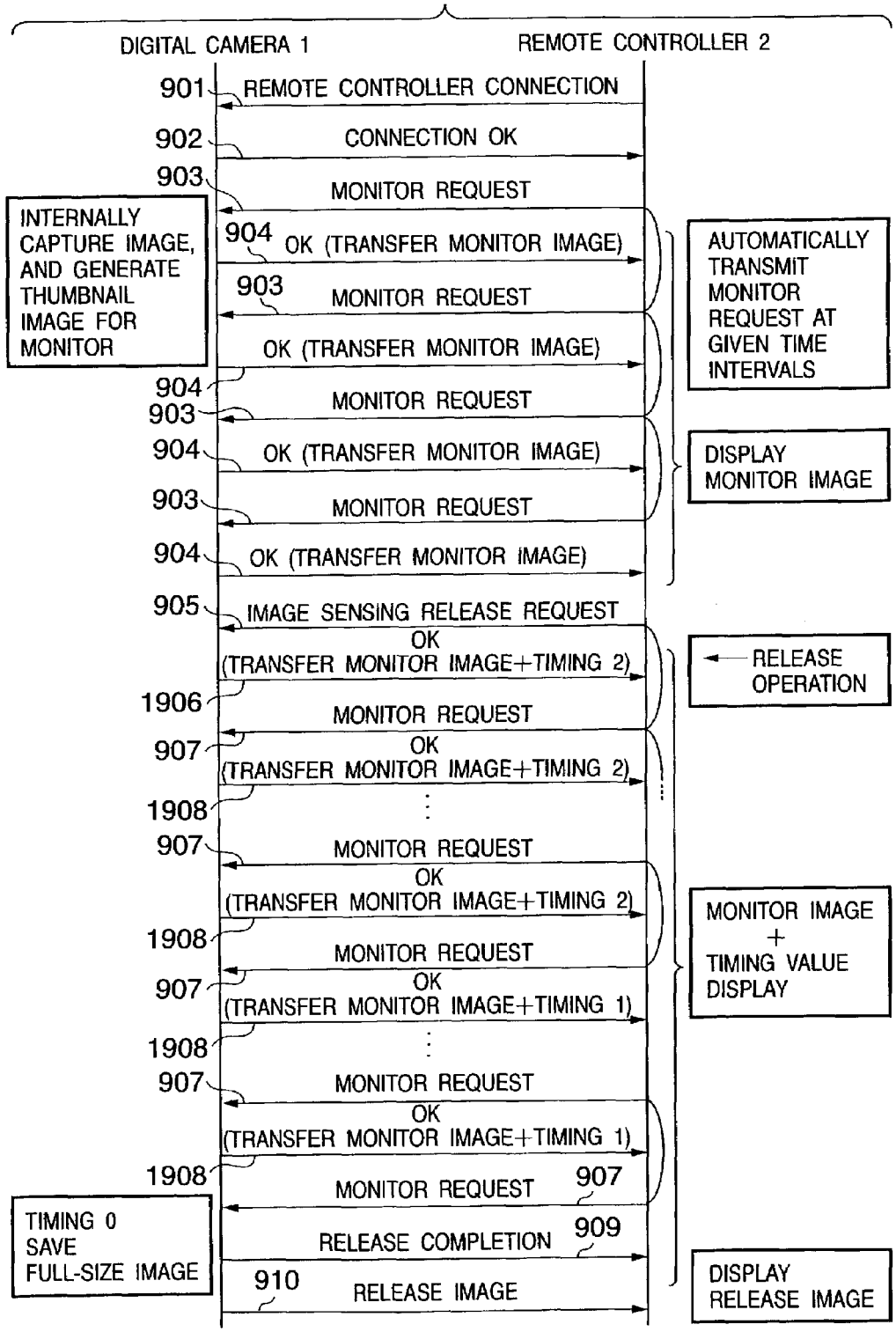
FIG. 13 is a sequence chart showing the operations between a digital camera and remote controller according to the fifth embodiment of the present invention.

In this embodiment, the process in the digital camera 1 executed when the digital camera 1 makes wireless communications with the wireless controller 210 of the remote controller 2 via the wireless controller 112 is the same as that which has been explained previously using the flow chart of FIG. 3 in the first embodiment. However, since the operations between the digital camera 1 and remote controller 2 are slightly different from the first embodiment, the differences will be explained using the sequence chart of FIG. 13. Also, since the process in the remote controller 2 executed when the remote controller 2 makes wireless communications with the wireless controller 112 of the digital camera 1 via the wireless controller 210 is slightly different from the first embodiment, the differences will be explained using the flow chart in FIG. 14.

Upon reception of a release request signal from the remote controller 2, the digital camera 1 transmits a monitor image obtained by encoding an input signal of an image currently sensed by the CCD 116 by the signal processing circuit 115, and a timing value (1906) until the digital camera 1 actually releases the shutter. After the release request signal is received, the digital camera 1 transmits a timing value together with a monitor image (1908) upon reception of a monitor request signal. That is, the CPU 101 decrements the timing value stored in the RAM 103 at predetermined time intervals, executes an image sensing operation when the timing value has reached 0, and notifies the remote controller 2 of completion of release. In this case, the timing value is decremented from N to 0. Of course, the timing value may be incremented from 1 to N, and an image sensing operation may be made at the timing of the predetermined value N.

Figure 14:
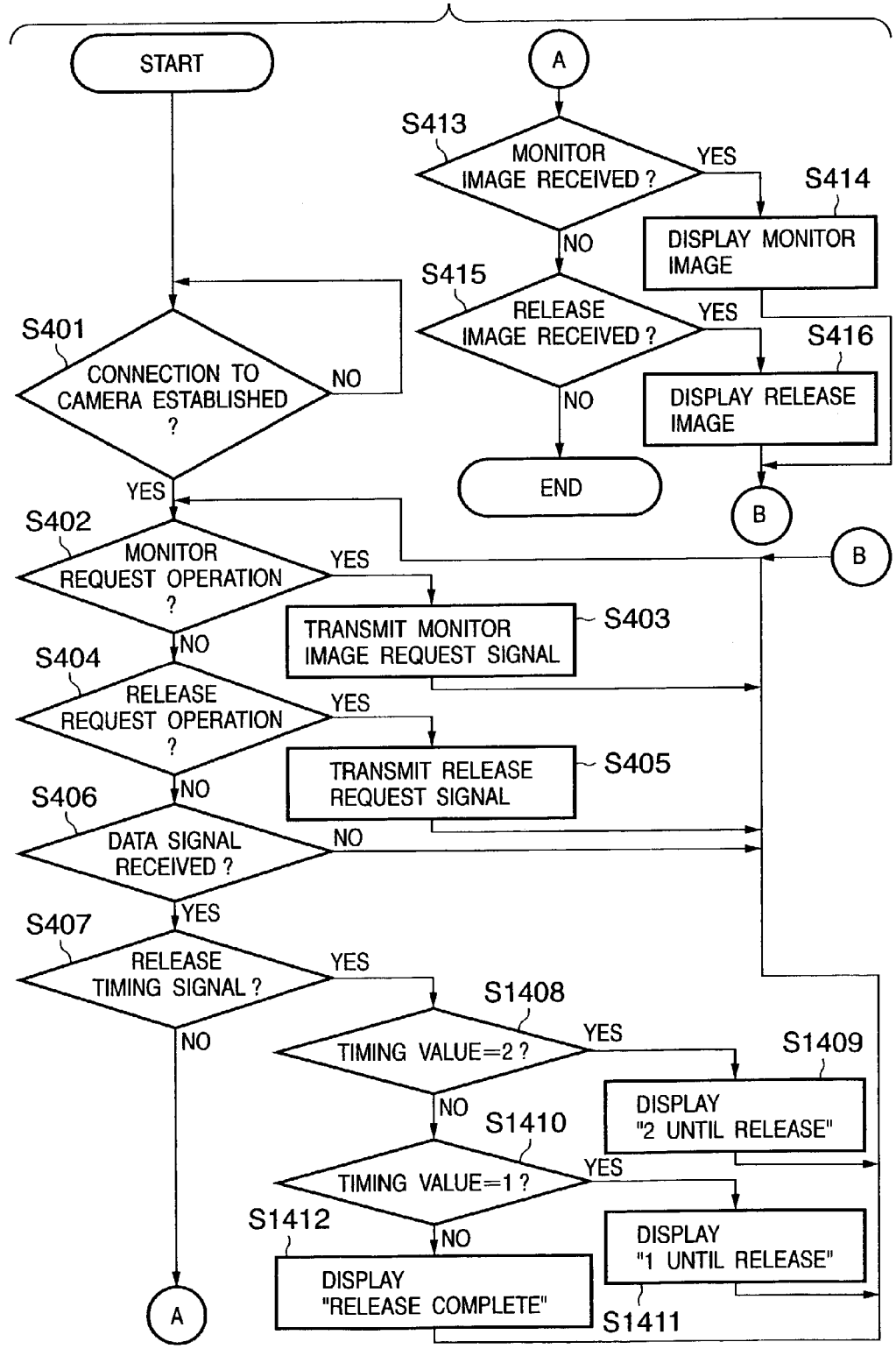
FIG. 14 is a flow chart showing the operation of the remote controller according to the fifth embodiment of the present invention.

By contrast, if the data received from the digital camera 1 is a release timing signal (1906, 1908) sent together with a monitor image in step S407 in FIG. 14, the flow advances to step S1408, and the remote controller 2 confirms a timing value contained in that signal. If the timing value (1906, 1908) is 2, the flow advances from step S1408 to step S1409. In step S1409, the remote controller 2 superimposes "2" on the monitor image received together with this timing value, and displays that image on the display 208. On the other hand, if the timing value is 1, the flow advances from step S1408 to step S1411 via step S1410. In step S1410, the remote controller 2 superimposes "1" on the monitor image received together with this timing value, and displays that image on the display 208. Since the digital camera 1 executes an actual image sensing operation at a timing at which the timing value has been decremented from 1 to 0, and transmits a release completion signal after completion of the image sensing operation, if the received timing value is the release completion signal (909), the flow advances to step S1412 to display "complete" on the display 208.

In this embodiment, "2", "1", and "complete" are displayed in turn. However, the present invention is not limited to this, and "3", "2", "1", and "0" may be displayed in turn. Note that the display 208 provided to the remote controller 2 preferably comprises an LCD, organic EL panel, or the like, which can display an image. In addition, LEDs or the like may be used. When the LEDs are used, the remote controller 2 may inform an object of a count-down process until the release timing by changing the flickering speed or color. The digital camera 1 transmits a timing value together with the monitor image. Upon receiving the timing value together with the monitor image, the remote controller 2 superimposes the timing value on the monitor image, and displays that image. Alternatively, the digital camera 1 may superimpose a timing value on a monitor image, and transmit that image, and the remote controller 2 may receive and display that composite image. In this case as well, the timing value is transmitted together with the image obtained by superimposing the timing value on the monitor image, so that the remote controller 2 can confirm the timing value.

The timing value may be transmitted as data independent from a monitor image, or may be transmitted as additional data of a monitor image, as long as the timing value can be confirmed on the remote controller 2 side.

When the timing value is transmitted as data independent from a monitor image, the time required until a monitor image is displayed can be shortened. On the other hand, when the timing value is transmitted as additional data, a monitor image corresponding to that timing value can be easily recognized.

In the above description, the timing value is superimposed on the monitor image, and the composite image is displayed. Alternatively, the display 208 of the remote controller 2 may display the monitor image and timing value on independent areas. In this way, the monitor image can be prevented from becoming harder to confirm due to the timing value superimposed on it.

As described above, according to this embodiment, when the digital camera is remote-controlled by the remote controller, the remote controller notifies the user of the actual release timing on the digital camera side by displaying it together with a monitor image. Hence, an object on the remote controller side can adequately recognize a shutter timing while confirming a monitor image. Since the timing value display changes depending on timings, the user can easily determine a timing until release.

Note that the user may freely change a display screen image corresponding to the timing value to be displayed together with the monitor image. In this case, the remote controller may include Internet connection means, and may download a display screen image from the Internet, or may receive display screen image data transmitted from the digital camera 1 via wireless communications such as Bluetooth or the like. If the user can freely change a display screen image, the user's convenience can be further improved.

Sixth Embodiment

An image sensing system according to the sixth embodiment of the present invention will be described below. In this embodiment, information indicating a release timing until release is transmitted only once from the digital camera to the remote controller, as in the second embodiment. Since other arrangements and operations are the same as those in the fifth embodiment, the same reference numerals denote the same components or processes, and a description thereof will be omitted.

The process in the digital camera 1 executed when the digital camera 1 according to this embodiment makes wireless communications with the wireless controller 210 of the remote controller 2 via the wireless controller 112 is the same as that in the second embodiment which has been explained previously using the flow chart of FIG. 5.

Figure 15:
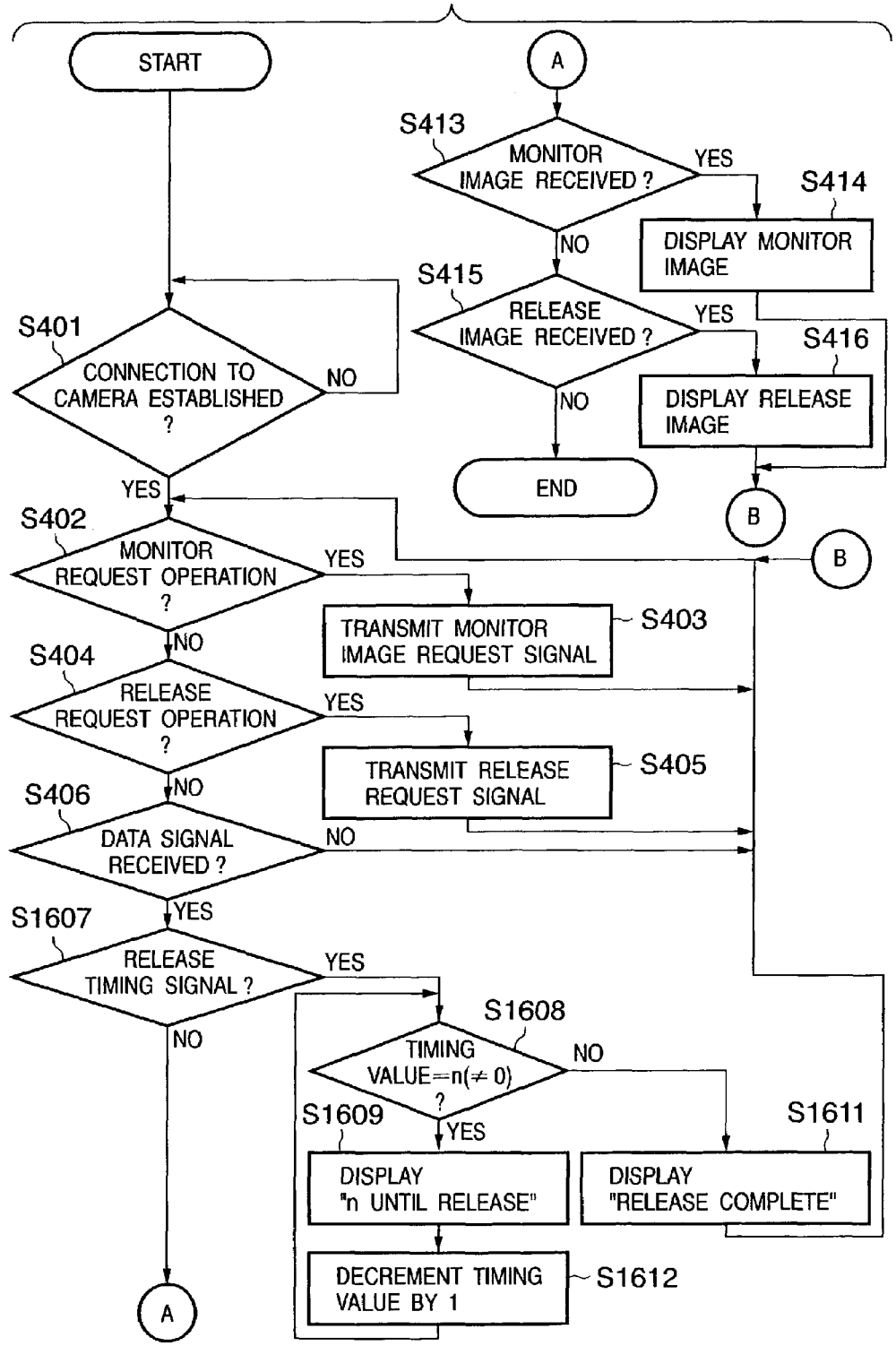
FIG. 15 is a flow chart showing the operation of a remote controller according to the sixth embodiment of the present invention.

FIG. 15 is a flow chart showing the process in the remote controller 2 executed when the remote controller 2 according to this embodiment makes wireless communications with the wireless controller 112 of the digital camera 1 via the wireless controller 210. Processes in steps S1608 to S1612 are different from FIG. 14.

If it is determined in step S1607 that a data signal received from the digital camera 1 is release timing information, the flow advances from step S1607 to step S1608 to confirm whether or not the timing value contained in that information is 0. If the timing value is not 0, the flow advances to step S1609. In step S1609, that timing value is superposed on a monitor image received together with the timing information and the composite image is displayed. The flow then advances to step S1612 to decrement the timing value. After that, every time a monitor image is received, the timing value decremented in step S1612 superimposed on the received monitor image and the composite image is displayed. This process is repeated to display timing information until the timing value becomes 0. If the timing value has become 0, since an actual image sensing operation is done on the digital camera 1 side, the flow advances from step S1608 to step S1611 to display "complete".

Note that the intervals that the digital camera and remote controller decrement the timing value must be synchronized. However, since communication clocks are synchronized when connection is established between the digital camera and remote controller in step S401, the digital camera and remote controller can synchronously decrement the timing value if the timing value is decremented using the clocks.

In this manner, since the shutter release timing can be independently determined on the digital camera 1 side and remote controller 2 side, wireless resources need not be wasted to notify a timing, thus achieving power savings in both the digital camera 1 and remote controller 2.

Seventh Embodiment

An image sensing system according to the seventh embodiment of the present invention will be described below. In the fifth embodiment, the digital camera 1 transmits a plurality of timing values to the remote controller 2 every time each timing value is required. However, in this embodiment, information indicating a timer time until release is transmitted only once. Since other arrangements and operations are the same as those in the fifth embodiment, the same reference numerals denote the same components or processes, and a description thereof will be omitted.

Note that the timing value of the fifth embodiment indicates a relative timing, and the timer value of this embodiment indicates an absolute time.

Figure 16:
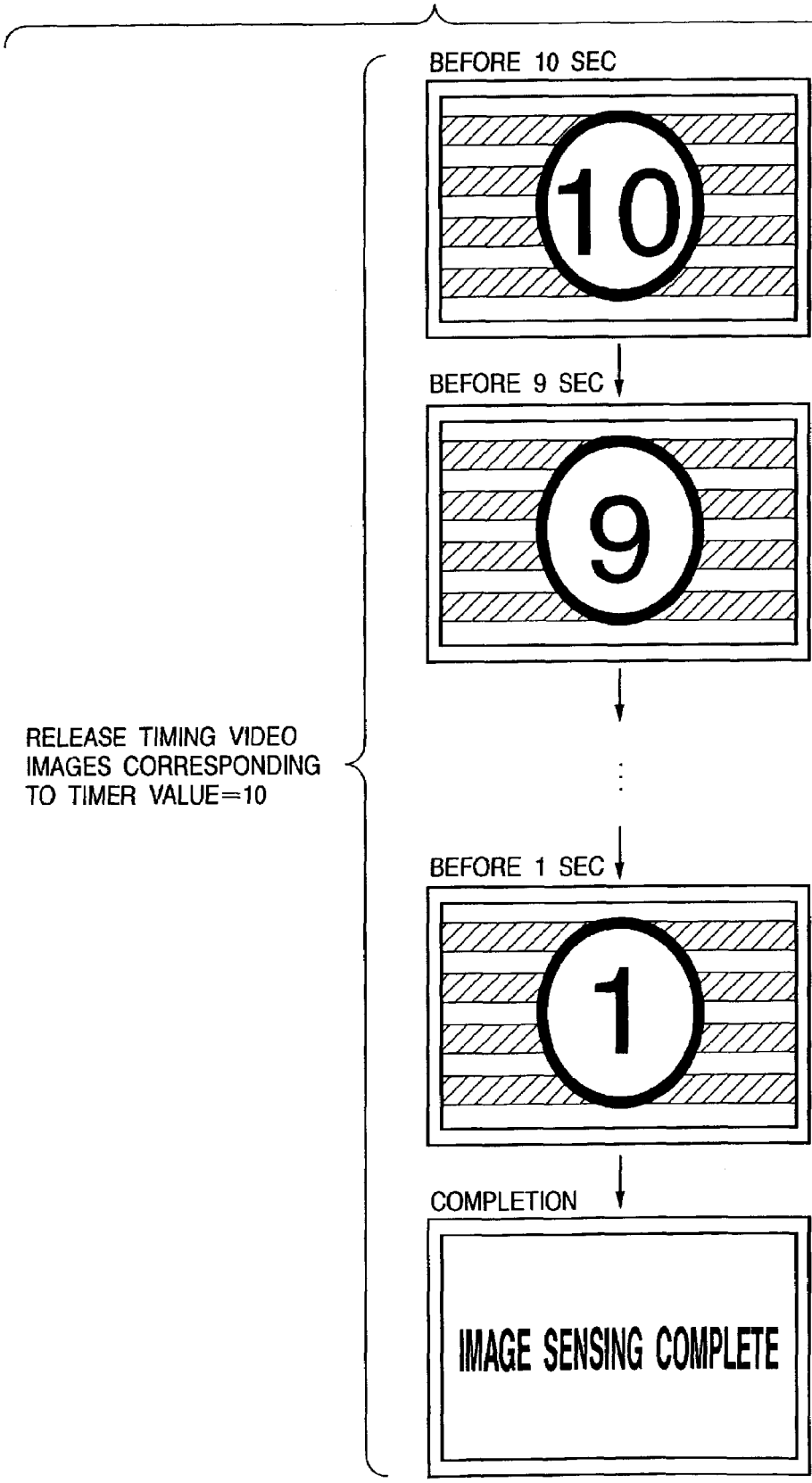
FIG. 16 shows an example of release timing notification video images displayed on a remote controller according to the seventh embodiment of the present invention.

In this embodiment, the digital camera 1 notifies the remote controller 2 of the timer value until release, and the remote controller 2 displays a release timing notification image prepared in advance on the basis of the notified time. FIG. 16 shows an example of release timing notification images displayed on the remote controller 2. FIG. 16 exemplifies a case wherein different images are displayed at 1-sec intervals from 10 sec before release.

Figure 17:
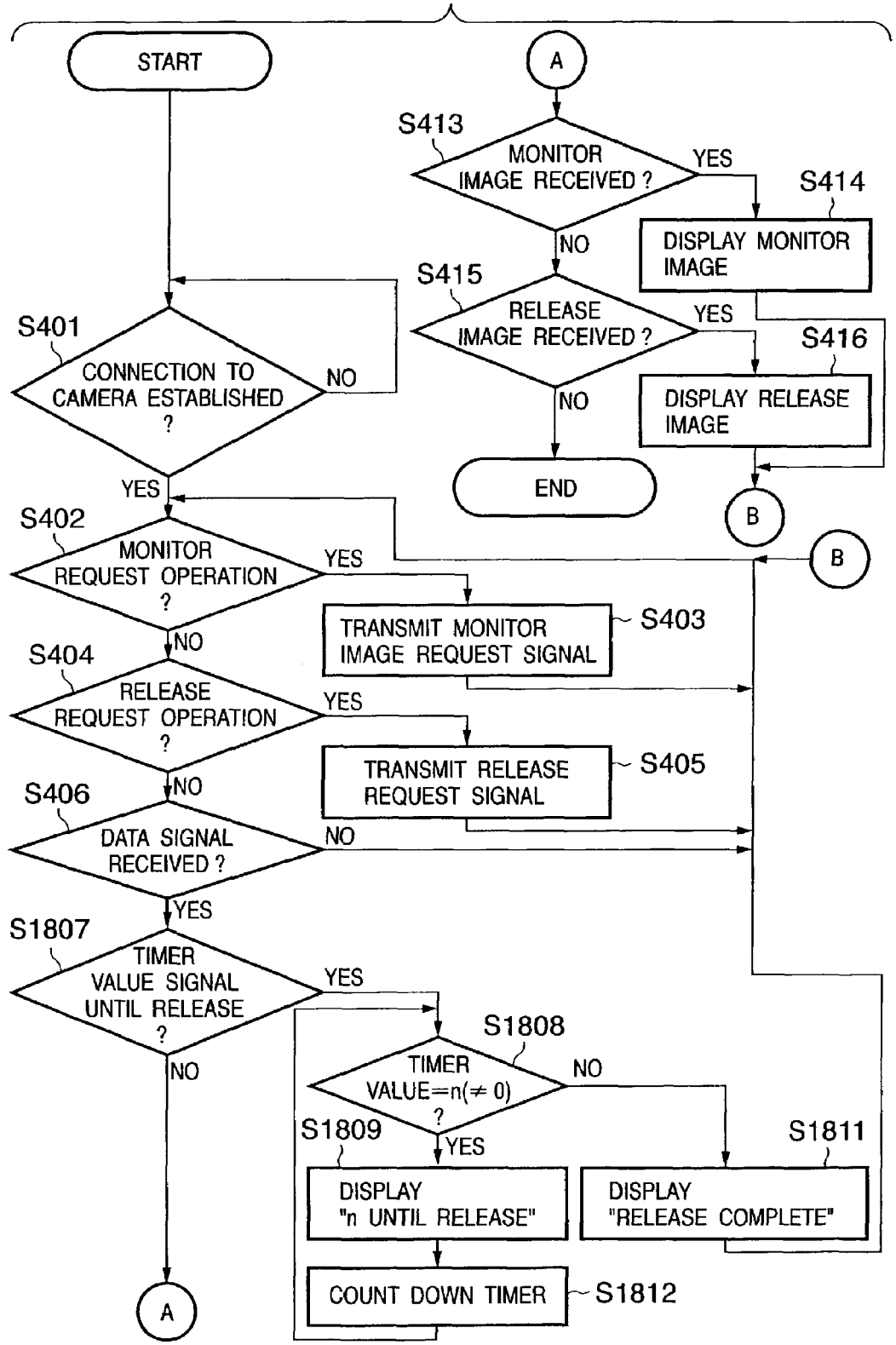
FIG. 17 is a flow chart showing the operation of the remote controller according to the seventh embodiment of the present invention.

FIG. 17 is a flow chart showing the process in the remote controller 2 executed when the remote controller 2 according to this embodiment makes wireless communications with the wireless controller 112 of the digital camera 1 via the wireless controller 210. Processes in steps S1807 to S1812 are different from FIG. 4.

Referring to FIG. 17, the remote controller 2 waits for a data signal received from the digital camera 1 in step S406. If a data signal is a release timer signal, the flow advances from step S1807 to step S1808 to confirm the remaining time contained in that signal. Then, an image corresponding to the remaining time is displayed together with a monitor image (S1809), and the remaining time is decremented as in the digital camera 1 (S1812). If the remaining time has become 0, since it matches the actual release timing of the digital camera 1, "complete" is displayed (S811). In the example of FIG. 16, upon receiving a timer value indicating the remaining time=10 sec from the digital camera, a series of images for 10 sec, which are prepared in advance, are displayed in turn, as shown in FIG. 16.

When the digital camera 1 is notified in advance of the duration of release timing notification video images stored in the remote controller 2, and the remaining time until release to be transmitted from the digital camera 1 to the remote controller 2 is set to be equal to the duration of the release timing notification video images, the user of the remote controller 2 can set arbitrary video images as those to be displayed until shutter release.

Eighth Embodiment

An image sensing system according to the eighth embodiment of the present invention will be described below. In the fifth embodiment, only one communication link is established between the digital camera 1 and remote controller 2 to transmit a monitor image and timing value via that link. However, when a monitor image and timing value are to be simultaneously transmitted as independent data, the digital camera 1 spends much time to encode a monitor image, and cannot often transmit a timing value until the monitor image is generated. When a timing value is transmitted at a low communication rate after a monitor image is transferred, much time is spent to transfer the monitor image, and the timing value cannot often be appropriately transmitted.

Hence, in this embodiment, a control data link used to transmit a timing value is established independently of a link used to transmit a monitor image.

Figure 18:
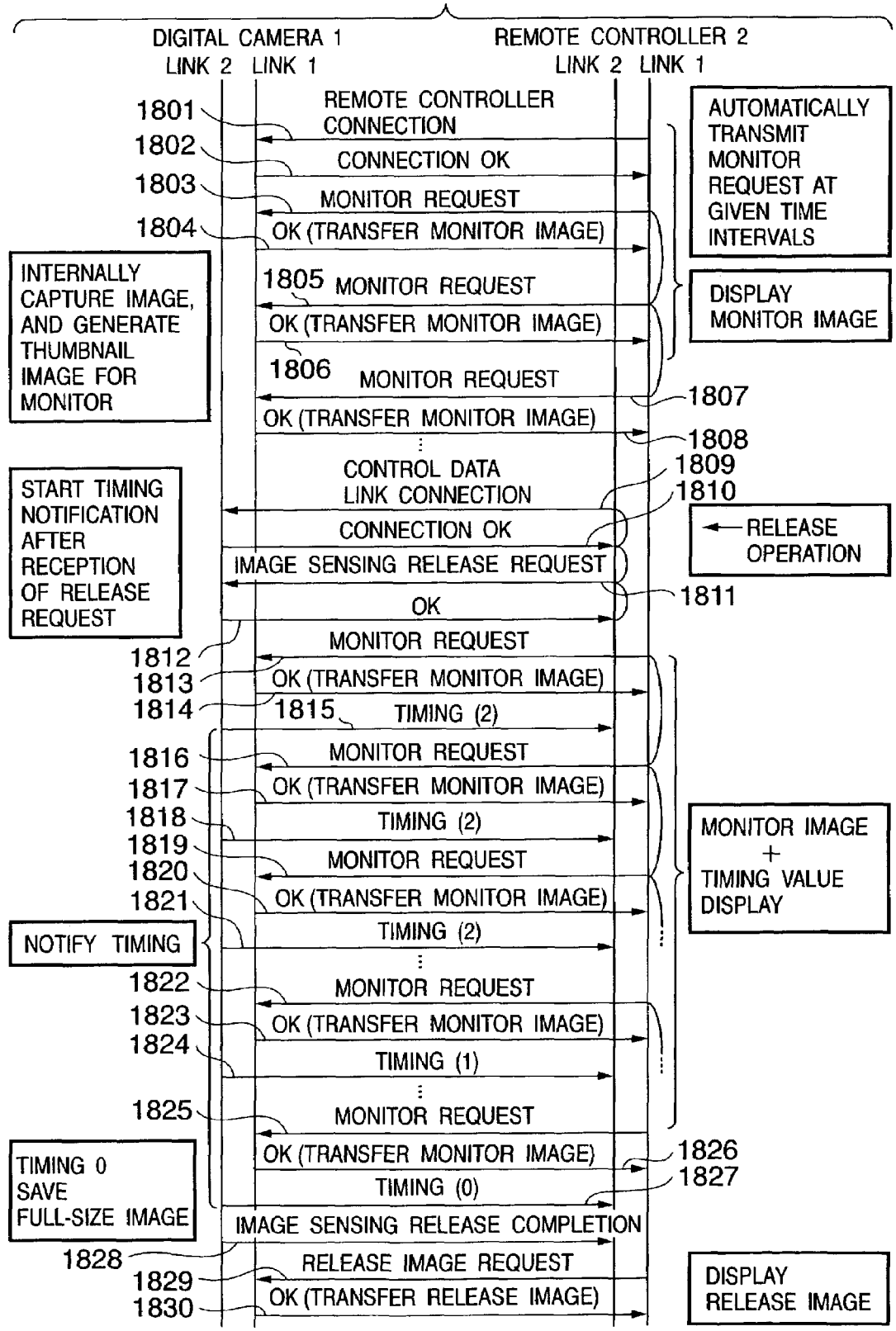
FIG. 18 is a sequence chart showing the operations between a digital camera and remote controller according to the eighth embodiment of the present invention.
Figure 19:
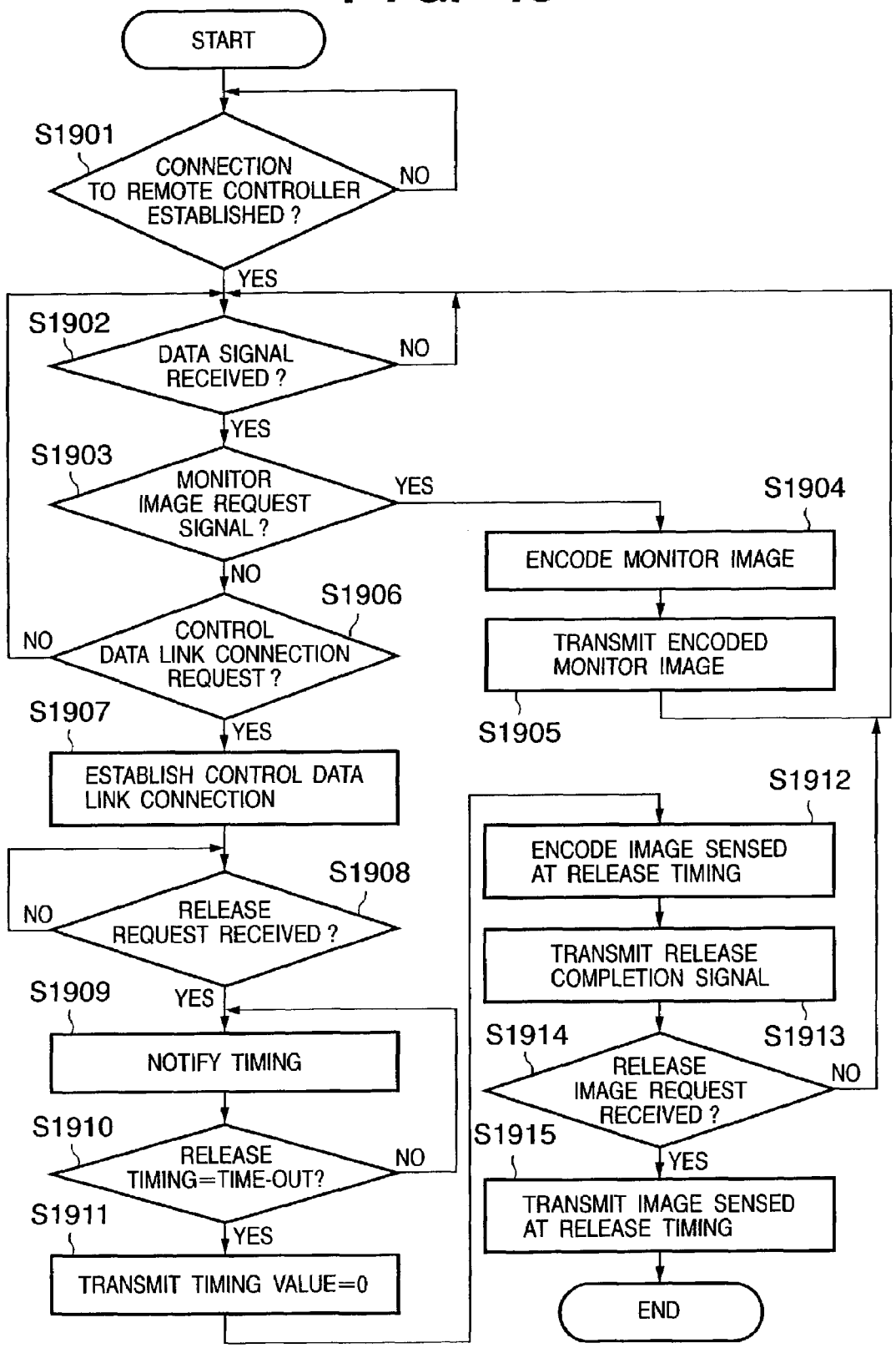
FIG. 19 is a flow chart showing the operation of the digital camera according to the eighth embodiment of the present invention.
Figure 20A:
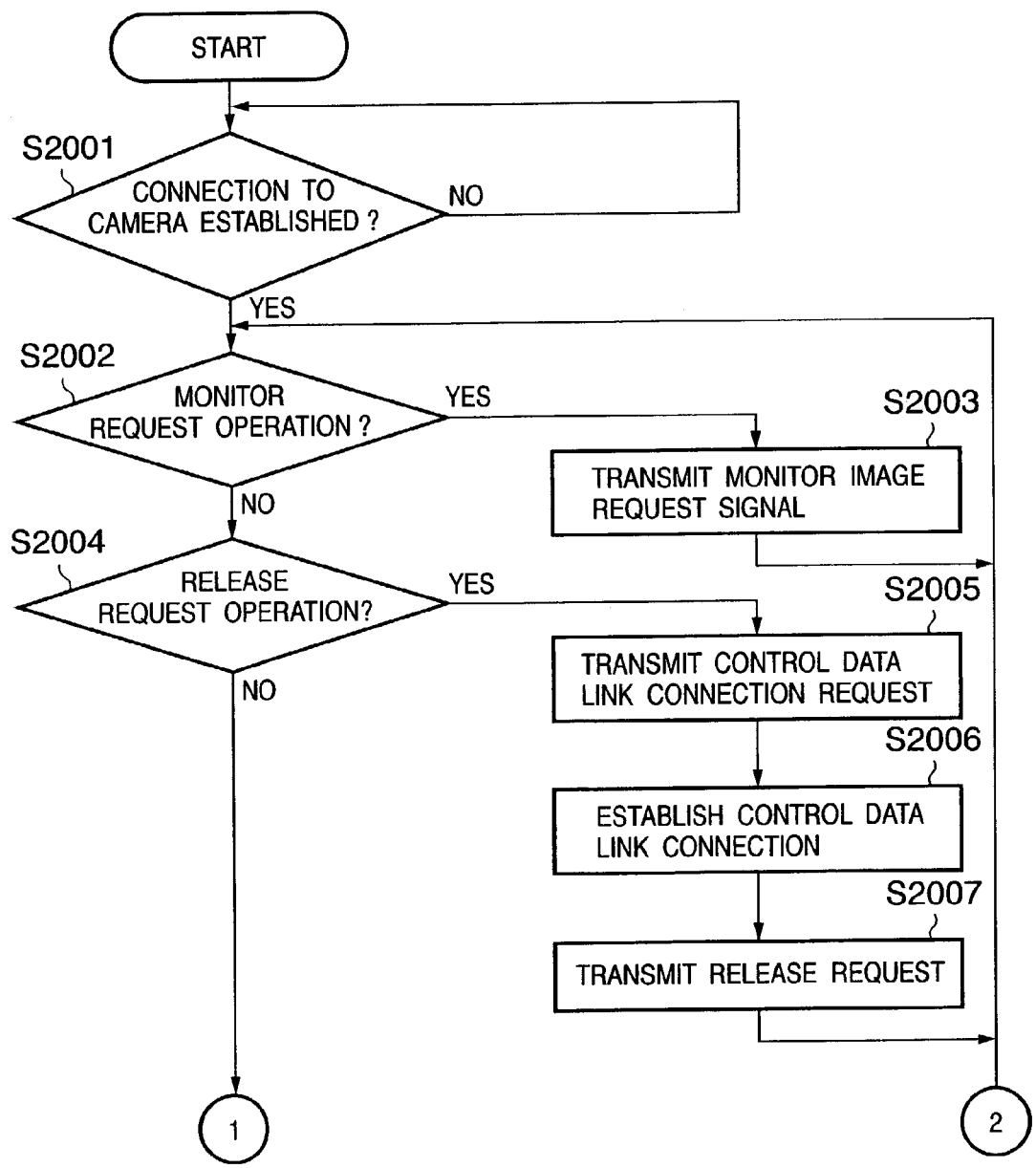
FIGS. 20A and 20B are flow charts showing the operation of the remote controller according to the eighth embodiment of the present invention.
Figure 20B:
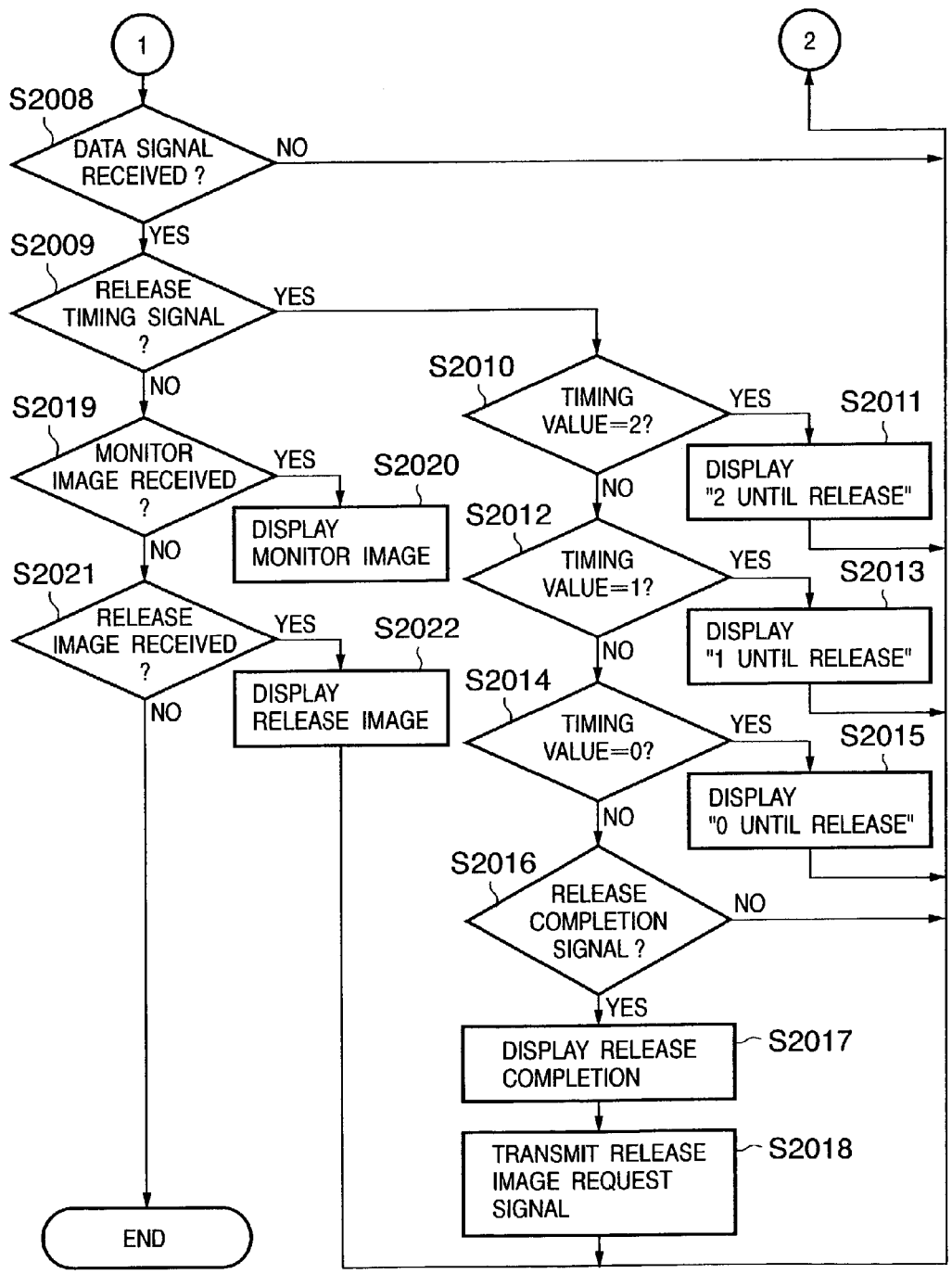

FIG. 18 is a sequence chart showing the operations between the digital camera 1 and remote controller 2. FIG. 19 is a flow chart showing the process in the digital camera 1 executed when the digital camera 1 makes wireless communications with the wireless controller 210 of the remote controller 2 via the wireless controller 112. FIGS. 20A and 20B are flow charts showing the process in the remote controller 2 executed when the remote controller 2 makes wireless communications with the wireless controller 112 of the digital camera 1 via the wireless controller 210. This embodiment will be explained below using FIGS. 18, 19, and 20A and 20B.

Upon reception of a wireless connection request from the remote controller 2 (1801), the digital camera 1 returns a connection permission (1802) to the remote controller 2 to establish wireless communication connection link 1 between the digital camera 1 and remote controller 2 (steps S1901 and S2001).

With this link 1, the digital camera 1 generates and transfers a monitor image in response to a monitor request from the remote controller 2. That is, the flow advances to step S2002 in FIG. 20A, and the remote controller 2 waits for an operation input from the operation controller 216. Upon detection of a monitor request operation, the flow advances to step S2003, and the remote controller 2 transmits a monitor image request signal (1803) to the digital camera 1. After that, the remote controller 2 periodically transmits a monitor image request signal (1805, 1807, 1813, 1816, 1819, 1822, 1825) until a monitor end operation is made.

The digital camera 1 waits for a data signal from the remote controller 2 in step S1902 in FIG. 19. Upon reception of the monitor request signal (1803) (step S1903), the signal processing circuit 115 encodes an input signal of an image currently sensed by the CCD 116. The flow advances to step S1904 to transmit the encoded image (1804) as a monitor image via the wireless controller 112. After that, every time a monitor image request signal (1805, 1807, 1813, 1816, 1819, 1822, 1825) is received, the digital camera 1 encodes an input signal of an image currently sensed by the CCD 116 using the signal processing circuit 115. Then, the digital camera 1 transmits the encoded monitor image (1806, 1808, 1814, 1817, 1820, 1823, 1826) to the remote controller 2 via the wireless controller 112. The remote controller 2 monitors a data signal from the digital camera 1 (step S2008). Upon receiving a monitor image (step S2019), the remote controller 2 displays the received monitor image.

If the remote controller 2 confirms in step S2004 that a release request operation has been made from the operation controller 216, it requests the digital camera 1 to establish control data link connection (1809, step S2005). Upon reception of this request in step S1906, the digital camera 1 replies "connection OK" (1810). Then, control data link 2 is established between the digital camera 1 and remote controller 2 (steps S1907 and S2006). Upon establishment of the control data link, the remote controller 2 sends an image sensing release request to the digital camera 1 (1811, step S2007). Upon reception of this request, the digital camera 1 replies "OK" (1812, step S1908), and starts timing notification until release at the same time (1815, step S1909). Even during control of link 2, the remote controller 2 transmits a monitor image request to the digital camera 1 (1813), and the digital camera 1 transmits a monitor image (1814). Upon reception of the monitor image, the remote controller displays that monitor image on the display 208. After that, the digital camera 1 periodically transmits timing signals until release via link 2 (1818, 1821, 1824, 1827).

The remote controller 2 monitors a data signal from the digital camera 1 (step S2008). Upon detection of a release timing signal, the flow advances to step S2010. If the received timing signal is "2" (1815, 1818, 1821), the flow advances from step S2010 to step S2011, and the remote controller 2 controls the display controller 207 to display "2 until release" on the monitor image displayed on the display 208. Likewise, if the received timing signal is "1" (1824), the flow advances from step S2012 to step S2013. In step S2013, the remote controller 2 controls the display controller 207 to display "1 until release" on the monitor image displayed on the display 208. Note that timing display is maintained even when a new monitor image is received and updates an old monitor image, from when a given timing signal is received until the next timing signal is received. In this manner, the user can always confirm the count down process of timing display even when the monitor image is updated.

If the received timing signal is "1" (1827), the flow advances from step S2014 to step S2015 to display "0 until release" on the monitor image displayed on the display 208 (step S2015). Upon reception of the timing signal=0, since the digital camera 1 has released the shutter, the user can confirm that a monitor image upon display of "0 until release" is close to that upon actual release.

The digital camera 1 monitors whether or not a release synchronous timing has been reached (step S1910), while periodically transmitting a timing signal in step S1909. If the release synchronous timing has been reached, the digital camera 1 transmits a timing signal=0 in step S1911. The shutter drive controller 114 releases the shutter, and a sensed image is encoded. Also, the digital camera 1 notifies the remote controller 2 of completion of image sensing release (1828, step S1913).

Upon reception of an image sensing release completion signal (1828) (step S2016), the remote controller 2 displays "complete" on the display 208 (S2017), and then transmits a release image request signal (1829) to the digital camera 1 (step S2018). Upon reception of this request, the digital camera 1 transmits a release image to the remote controller 2 (1830), steps S1914 and S1915). Upon receiving the release image (step S2021), the remote controller 2 displays that image on the display 208 (step S2022).

In the above description, the digital camera 1 transmits timing signals at given periods, but may transmit a timing signal only when a timing value is updated. With this control, traffic on control data link 2 can be reduced.

As described above, according to this embodiment, since the wireless link used to transmit/receive control information such as a timing signal and the like, and that for image data are independently controlled, timing signals can be transmitted independently of the image encoding performance of the digital camera 1, thus improving the release timing precision.

Another Embodiment

In the first to fourth embodiments, the digital camera 1 preferably generates delay error information of a timing produced due to a delay of wireless communications upon establishing wireless communication connection, and adds that delay error information to the timing value or remaining time to be transmitted to the remote controller 2.

In the fifth to eighth embodiments, no delays due to wireless communications are taken into consideration. However, when a release timing signal is generated in consideration of a delay caused by wireless communications in negotiation upon establishing wireless communication connection, synchronization between the digital camera 1 and remote controller 2 can be achieved more accurately. That is, the digital camera 1 preferably generates delay error information of a timing produced due to a delay of wireless communications upon establishing wireless communication connection, and adds that delay error information to the timing value or remaining time to be transmitted to the remote controller 2.

The preferred embodiments of the present invention have been explained, and the present invention may be applied to either a system constituted by a plurality of devices, or an apparatus consisting of a single equipment.

Note that the present invention includes a case wherein the invention is achieved by directly or remotely supplying a software program that implements the functions of the aforementioned embodiments to a system or apparatus, and reading out and executing the supplied program code by a computer of that system or apparatus. In this case, the form is not limited to a program as long as it has functions of the program.

Therefore, the program code itself installed in a computer to implement the functional process of the present invention using the computer implements the present invention. That is, the appended claims of the present invention include the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a floppy (tradename) disk, hard disk, optical disk, magnetooptical disk, MO, CD-ROM, CD-R, CD-RW, magnetic tape, nonvolatile memory card, ROM, DVD (DVD-ROM, DVD-R) and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the appended claims of the present invention include a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As described above, according to the above embodiments, the user can easily and adequately determine the release timing on the image sensing apparatus side while confirming a monitor image on the remote controller side.

The present application claims priority from Japanese patent Application Nos. 2002-111208, 2002-111209, 2003-074258 and 2003-074259 which are incorporated herein by reference.

As many apparently widely different embodiments of the present invention can be made without departing form the spirit and scope thereof, it is to be understood that the invention is not limited to the specific embodiments thereof except as defined in the appended claims.

What is claimed is:

1. An image sensing system which includes an image sensing apparatus, and a remote controller for remote-controlling said image sensing apparatus, said image sensing apparatus comprising:
obtaining means for obtaining a monitor image for monitoring;
control means for controlling remaining time until sensing an image in response to a request of the remote controller
generating means for generating delay error information of a transmitting timing produced due to a delay of wireless communication with the remote controller; and
transmission means for transmitting the monitor image obtained by said obtaining means, and image sensing timing information adjusted based on the delay error information generated by the generating means to said remote controller, said remote controller comprising:
request means for requesting of said image sensing apparatus for sensing an image;
display means for displaying the monitor image transmiffed from said image sensing apparatus; and
notification means for notifying an image sensing timing according to the image sensing timing information transmitted from said image sensing apparatus.

2. The system according to claim 1, wherein said transmission means transmits the monitor image and the image sensing timing information to said remote controller in response to a request of the monitor image from said remote controller.

3. The system according to claim 1, wherein said transmission means transmits the image sensing timing information every time the image sensing timing information has been updated.

4. The system according to claim 1, wherein said transmission means transmits the image sensing timing information once per image sensing operation to said remote controller in response to a request from said remote controller.

5. The system according to claim 4, wherein said remote controller further comprises timing value change means for changing the received image sensing timing information at predetermined time intervals.

6. The system according to claim 1, wherein said remote controller further comprises setting means for setting an image for notifying the image sensing timing.

7. The system according to claim 1, wherein said transmission means appends the image sensing timing information to the monitor image, and transmits the monitor image appended with the image sensing timing information.

8. The system according to claim 1, wherein said transmission means transmits the monitor image, and the image sensing timing information as independent data.

9. The system according to claim 1, wherein said image sensing apparatus and said remote controller can establish a plurality of links, and
said transmission means transmits the image and the image sensing timing information using different links.

10. The system according to claim 1, wherein said notification means plays a tone corresponding to the image sensing timing information from said image sensing apparatus.

11. The system according to claim 1, wherein said notification means indicates the image sensing timing based on the image sensing timing information from said image sensing apparatus.

12. The system according to claim 11, wherein said notification means composites and displays the monitor image and the information to indicate the image sensing timing.

13. The system according to claim 11, wherein said notification means displays the information to indicate the image sensing timing on the currently displayed monitor image upon reception of the image sensing timing information.

14. The system according to claim 11, wherein said notification means displays information to indicate the image sensing timing on independent areas of the monitor image.

15. An image sensing apparatus comprising:
obtaining means for obtaining a monitor image for monitoring; and
generating means for generating delay error information of a transmitting timing produced due to a delay of wireless communication with a remote controller;

transmission means for transmitting the monitor image obtained by said obtaining means, and an image sensing timing information adjusted based on the delay error information generated by the generating means to said remote controller so as to notify a user of an image sensing timing.

16. The apparatus according to claim 15, wherein said transmission means transmits the image sensing timing information together with the monitor image upon reception of a transmission request of the monitor image from the remote controller.

17. The apparatus according to claim 15, wherein said transmission means transmits the image sensing timing information together with the image upon reception of a transmission request of the image sensing timing information from the remote controller during transmission of the monitor image.

18. The apparatus according to claim 15, wherein said transmission means transmits the image sensing timing information as additional information of the monitor image.

19. The apparatus according to claim 15, wherein said transmission means transmits the monitor image and the image sensing timing information as independent data.

20. A method of controlling an image sensing system which includes an image sensing apparatus, and a remote controller for remote-controlling the image sensing apparatus, comprising:

an obtaining step of obtaining a monitor image for monitoring;

a generating step of generating delay error information of a transmitting timing produced due to a delay of wireless communication with the remote controller;

a transmission step of transmitting the monitor image obtaining by said obtaining step, and an image sensing timing information adjusted based on the delay error information generated in the generating step to the remote controller in the image sensing apparatus;

a displaying step of displaying, in the remote controller, the monitor image transmitted from the image sensing apparatus; and a notification step of notifying, in the remote controller, the image sensing timing according to the image sensing timing information transmitted from the image sensing apparatus.

21. A method of controlling an image sensing apparatus, comprising:

an obtaining step of obtaining a monitor image for monitoring;

a generating step of generating delay error information of a transmitting timing produced due to a delay of wireless communication with a remote controller;

a transmission step of transmitting the monitor image obtained by said obtaining step, and an image sensing timing information adjusted based on the delay error information generated in the generating step to the remote controller so as to notify a user of an image sensing timing.

* * * * *